United States Patent
Pearse et al.

(10) Patent No.: US 9,473,258 B2
(45) Date of Patent: Oct. 18, 2016

(54) RF SIGNAL ALIGNMENT CALIBRATION

(71) Applicant: Spirent Communications PLC, Crawley, West Sussex (GB)

(72) Inventors: Neil Christopher Pearse, Paignton (GB); Steve Michael Moroz, Paignton (GB); Mark Geoffrey Holbrow, Paignton (GB)

(73) Assignee: SPIRENT COMMUNICATIONS PLC, Crawley (GB)

( * ) Notice: Subject to any disclaimer, the term of this patent is extended or adjusted under 35 U.S.C. 154(b) by 61 days.

(21) Appl. No.: 14/461,208

(22) Filed: Aug. 15, 2014

(65) Prior Publication Data

US 2016/0050034 A1 Feb. 18, 2016

(30) Foreign Application Priority Data

Aug. 15, 2014 (GB) .................................. 1414514.8

(51) Int. Cl.
*H04B 17/00* (2015.01)
*H04B 17/21* (2015.01)
(Continued)

(52) U.S. Cl.
CPC ............... *H04B 17/21* (2015.01); *G01S 19/03* (2013.01); *G01S 19/23* (2013.01); *H04B 17/11* (2015.01); *H04L 7/10* (2013.01)

(58) Field of Classification Search
CPC .... H04B 1/7085; H04B 1/7087; H04B 7/10; H04B 17/21; H04L 2027/0083; H04L 27/2657
USPC ...................................... 455/67.14; 375/150
See application file for complete search history.

(56) References Cited

U.S. PATENT DOCUMENTS

2004/0240581 A1* 12/2004 Salapski ................. G01S 19/02
375/295
2006/0047842 A1* 3/2006 McElwain ........ H03M 13/2957
709/231
(Continued)

FOREIGN PATENT DOCUMENTS

| JP | 2008249649 A | 10/2008 |
|---|---|---|
| WO | 9614697 A1 | 5/1996 |
| WO | 2005109028 A1 | 11/2005 |

OTHER PUBLICATIONS

Spirent Technical Data Pamphlet: GSS9000 Constellation Simulator; MCD00210 Issue 1-01 04/14; published Apr. 4, 2014; downloaded Feb. 6, 2015 datasheet at http://www.spirent.com/~/media/Datasheets/positioning/GSS9000.pdf.
(Continued)

*Primary Examiner* — Ayodeji Ayotunde
(74) *Attorney, Agent, or Firm* — Yiding Wu; Haynes Beffel & Wolfeld LLP

(57) ABSTRACT

A method is provided for aligning RF signals of a first channel bank and additional channel banks in a test platform. A plurality of correlators is used to correlate a reference code signal carrying a particular code at a particular chip rate with a received code signal carrying the particular code at the particular chip rate from the first channel bank to establish a first timing offset. The plurality of correlators is used to correlate a continuation of the reference code signal with additional received code signals carrying the particular code at the particular chip rate from the additional channel banks to establish additional timing offsets. The first timing offset and additional timing offsets are applied to the first and additional channel banks. The plurality of correlators includes 72 correlators, and a timing offset established in a correlation interval having a shorter duration than a length of the particular code.

20 Claims, 21 Drawing Sheets

(51) Int. Cl.
*G01S 19/23* (2010.01)
*H04B 17/11* (2015.01)
*G01S 19/03* (2010.01)
*H04L 7/10* (2006.01)

(56) References Cited

U.S. PATENT DOCUMENTS

2008/0075216 A1* 3/2008 Li .................... H04B 1/7085
       375/355
2011/0257923 A1 10/2011 Boulton
2013/0202068 A1* 8/2013 Ly-Gagnon ....... H04W 52/0225
       375/343
2014/0218240 A1* 8/2014 Kpodzo ................ G01S 5/0215
       342/450
2014/0225773 A1 8/2014 Boulton

OTHER PUBLICATIONS

Search and Examination Report for Application No. GB1414514.8 dated Feb. 9, 2015.
GNSS Receivers One Step Deeper, Danish GPS Center, 2013, consisting of 42 pages.

* cited by examiner

Figure 2: Digital Signal Processing Portion of a Channel Bank

Figure 3: Analog Signal Processing Portion of a Channel Bank

Figure 4: Analog Domain of the Calibrator

| BI-POLAR XNOR (EXCLUSIVE NOR) FUNCTION | X | Y | Z |
|---|---|---|---|
| | −1 | −1 | +1 |
| | +1 | −1 | −1 |
| | −1 | +1 | −1 |
| | +1 | +1 | +1 |

Figure 6

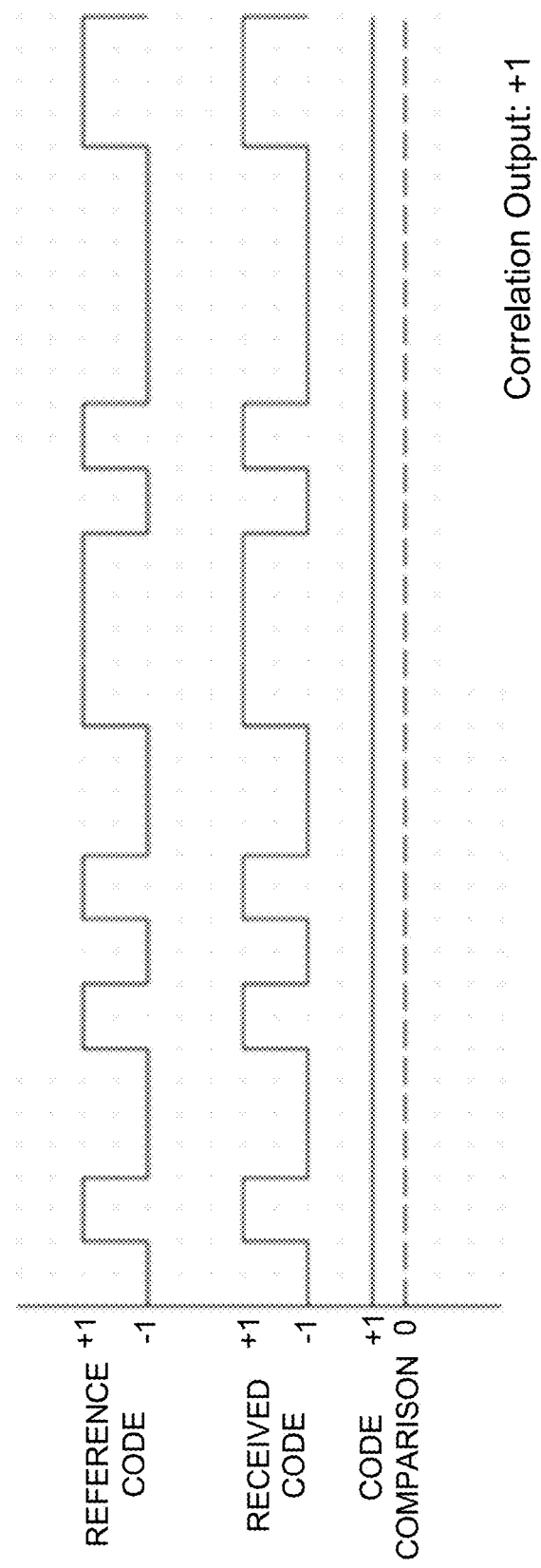
Figure 7: Identical codes in Alignment

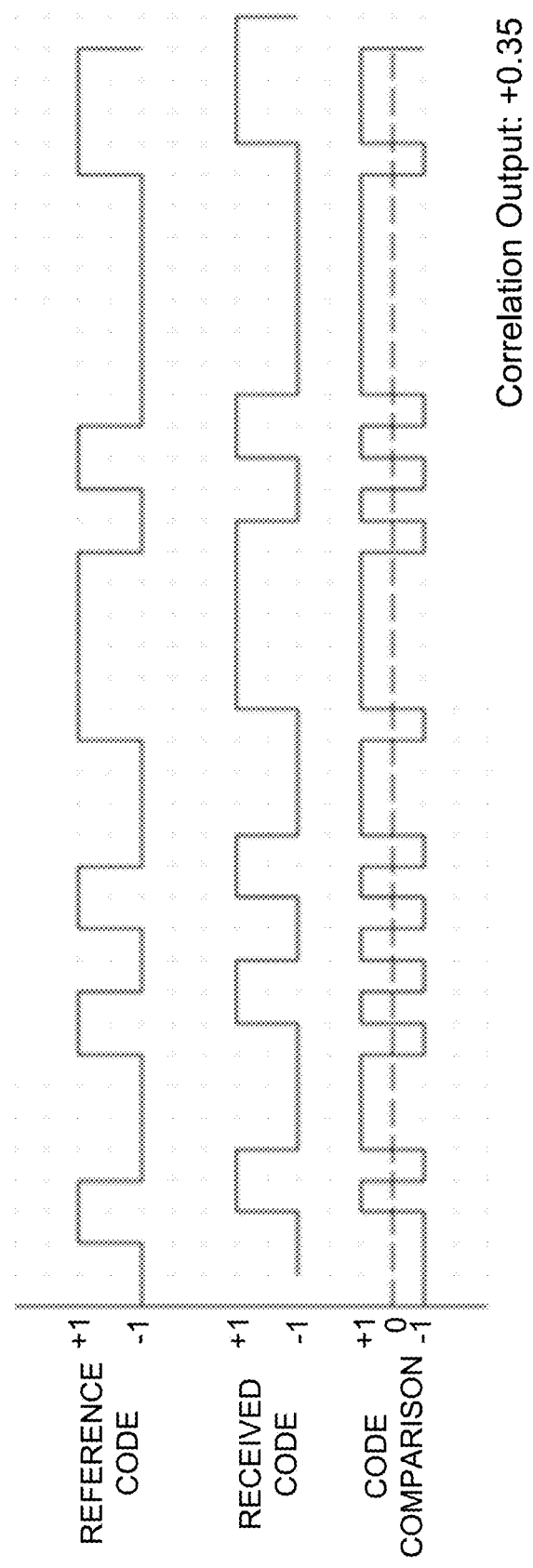
Figure 8: Identical codes Misaligned

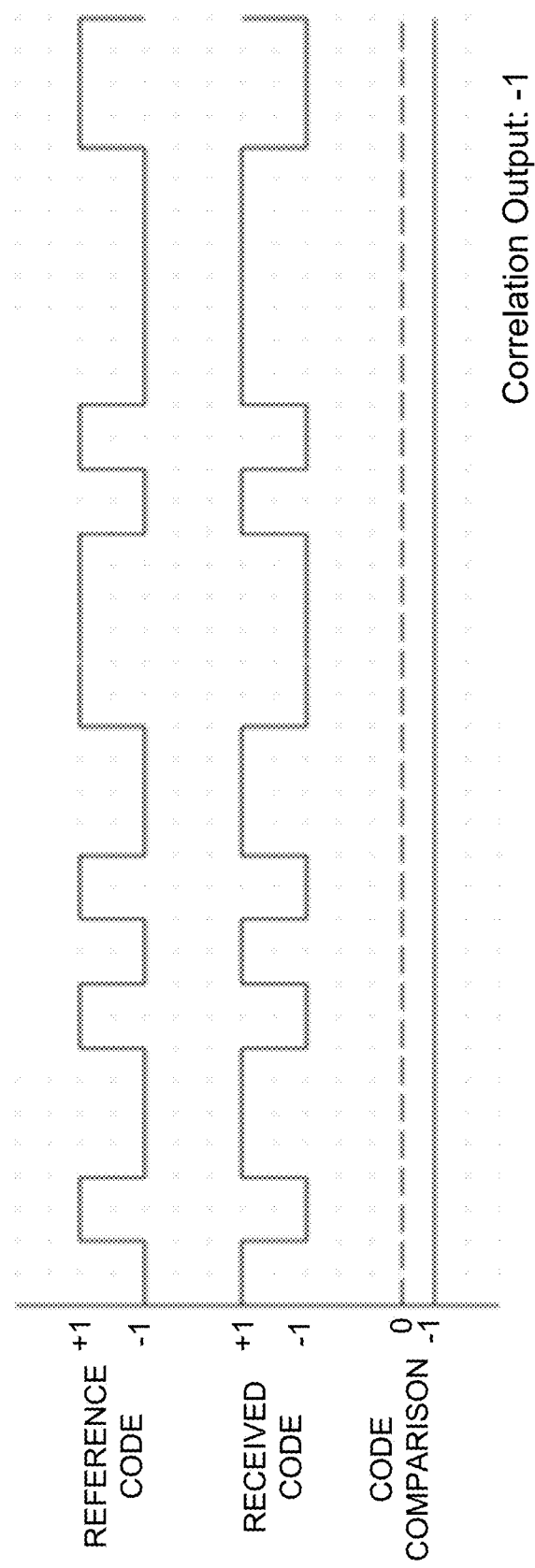
Figure 9: Identical codes with opposite signs

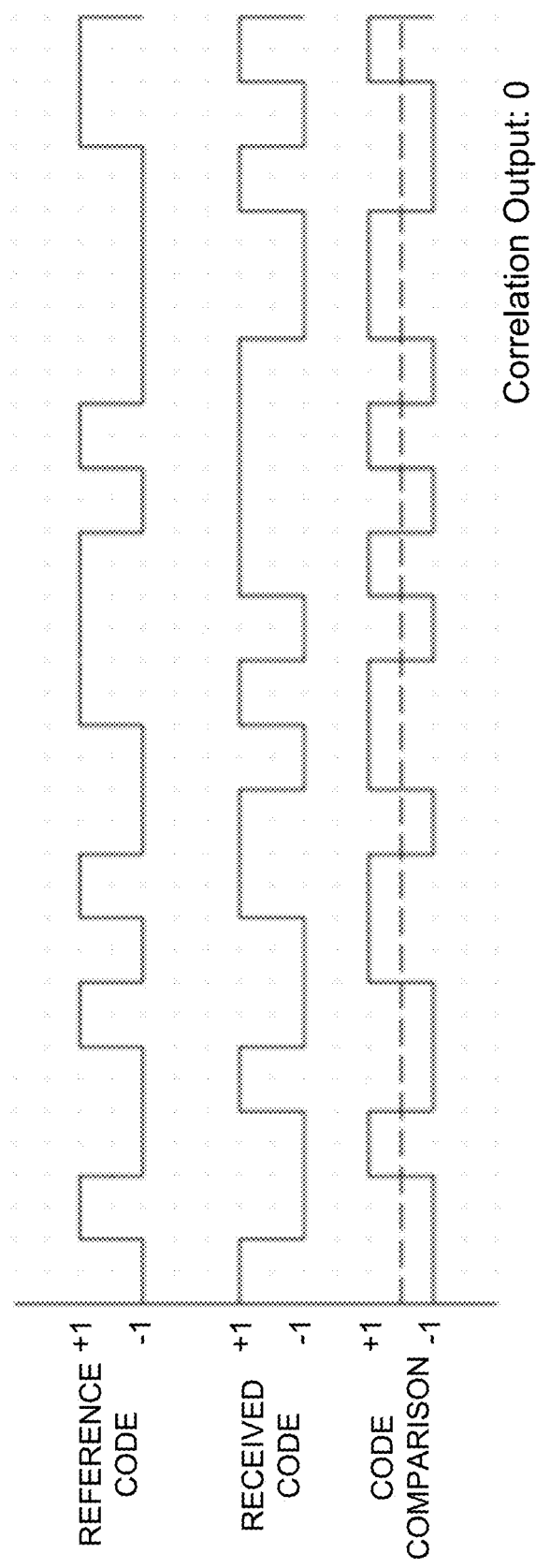
Figure 10: Different codes - no correlation

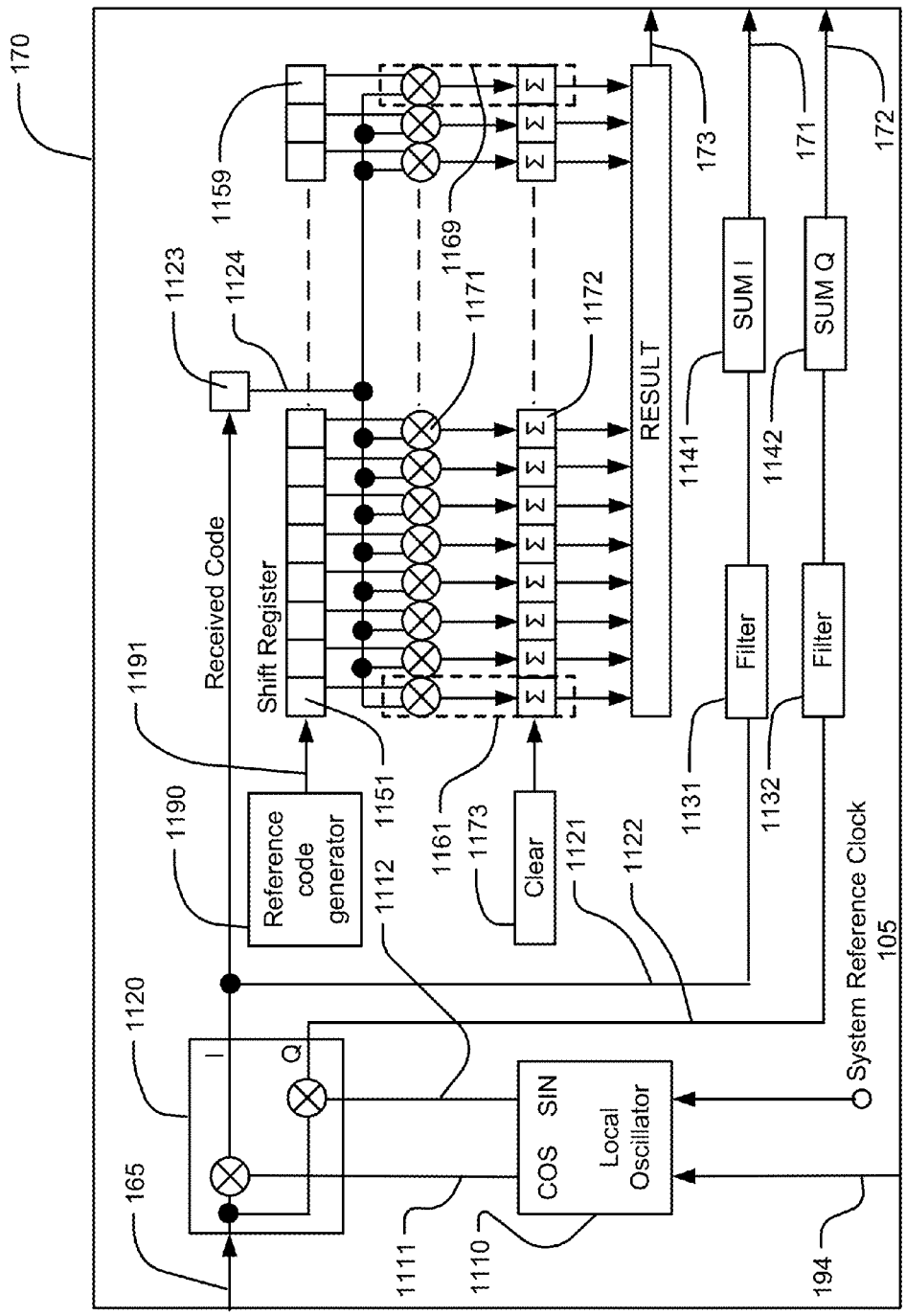
Figure 11: Digital Domain of the Calibrator

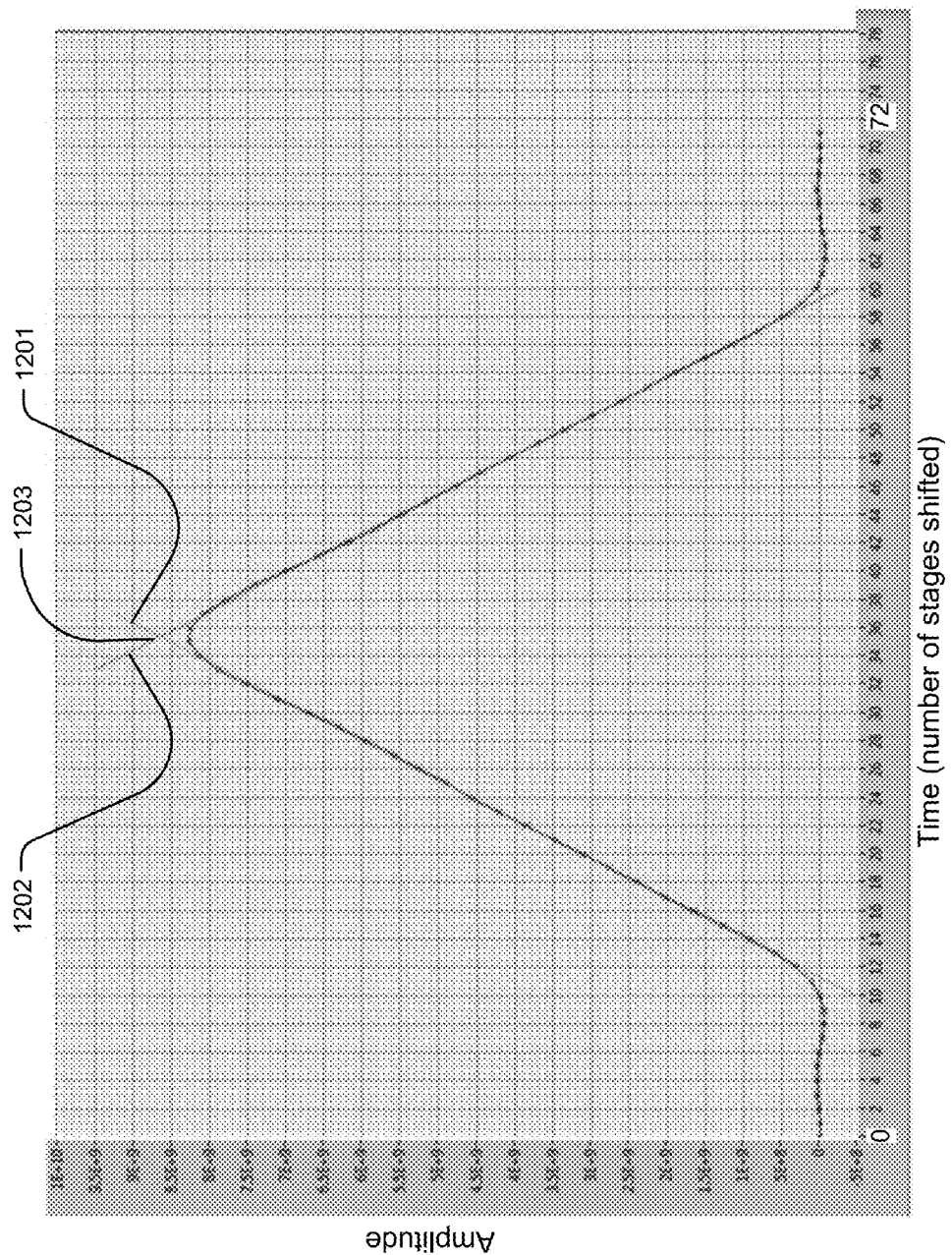
Figure 12: Correlation Peak

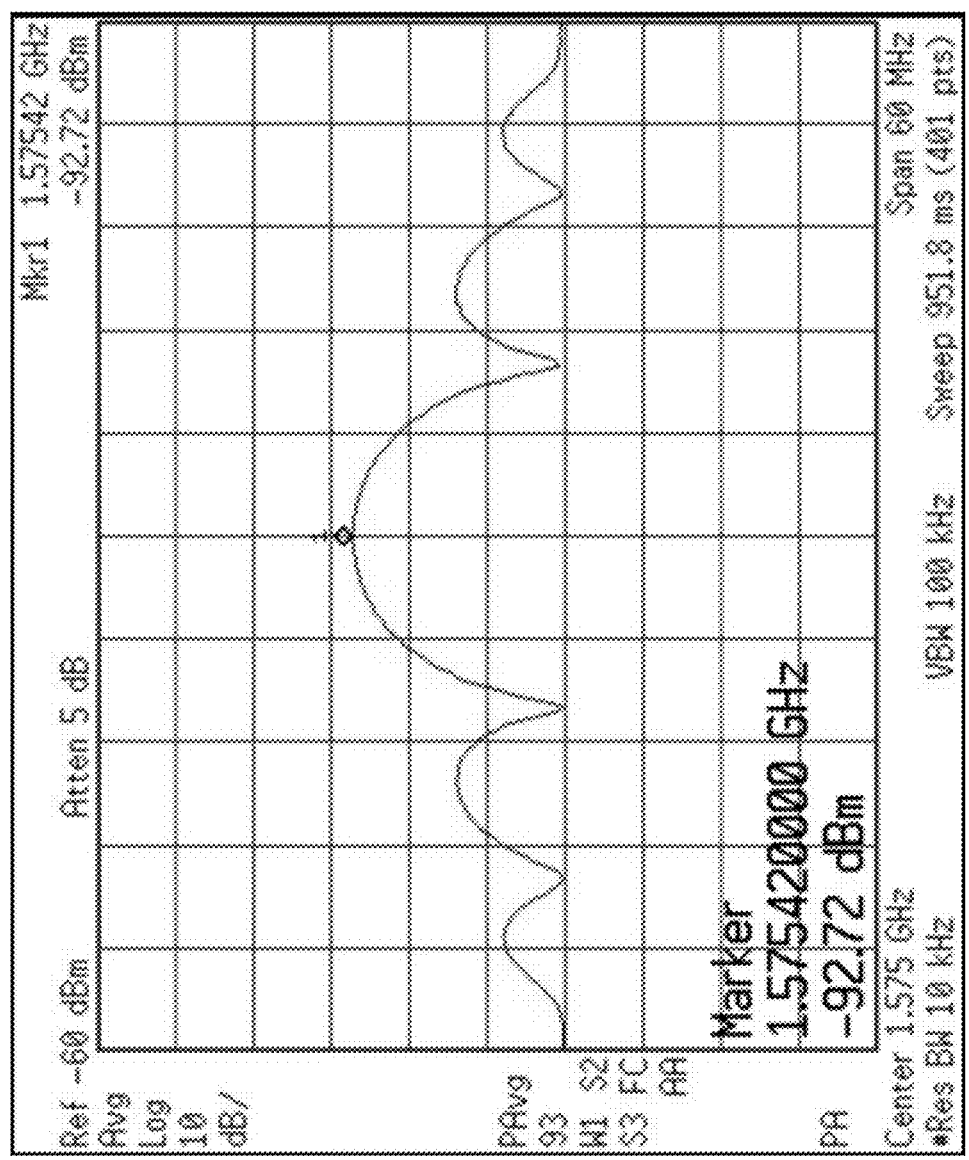
Figure 13: RF=1.57542GHz at calibrator input

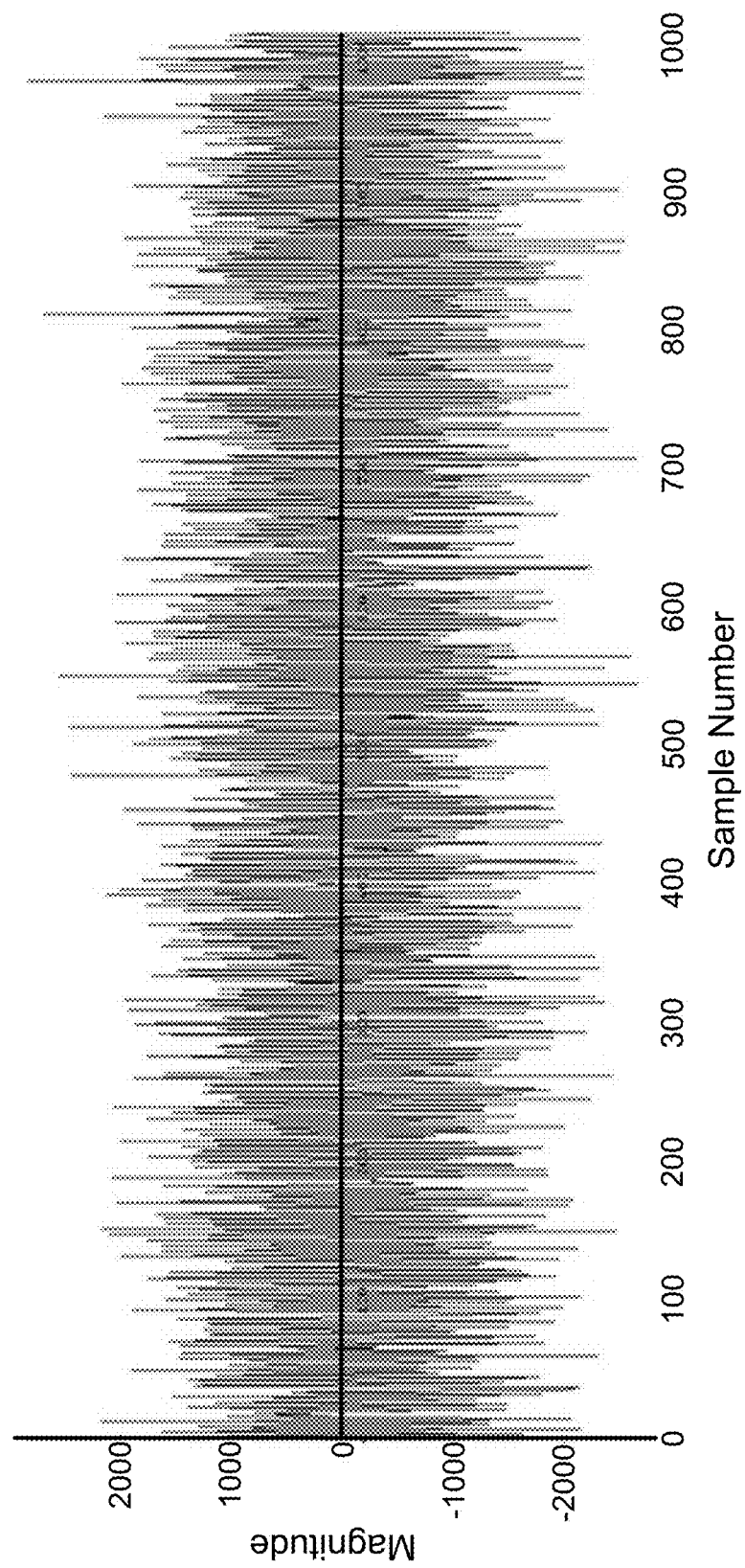
Figure 14: Digital data from the ADC in the calibrator

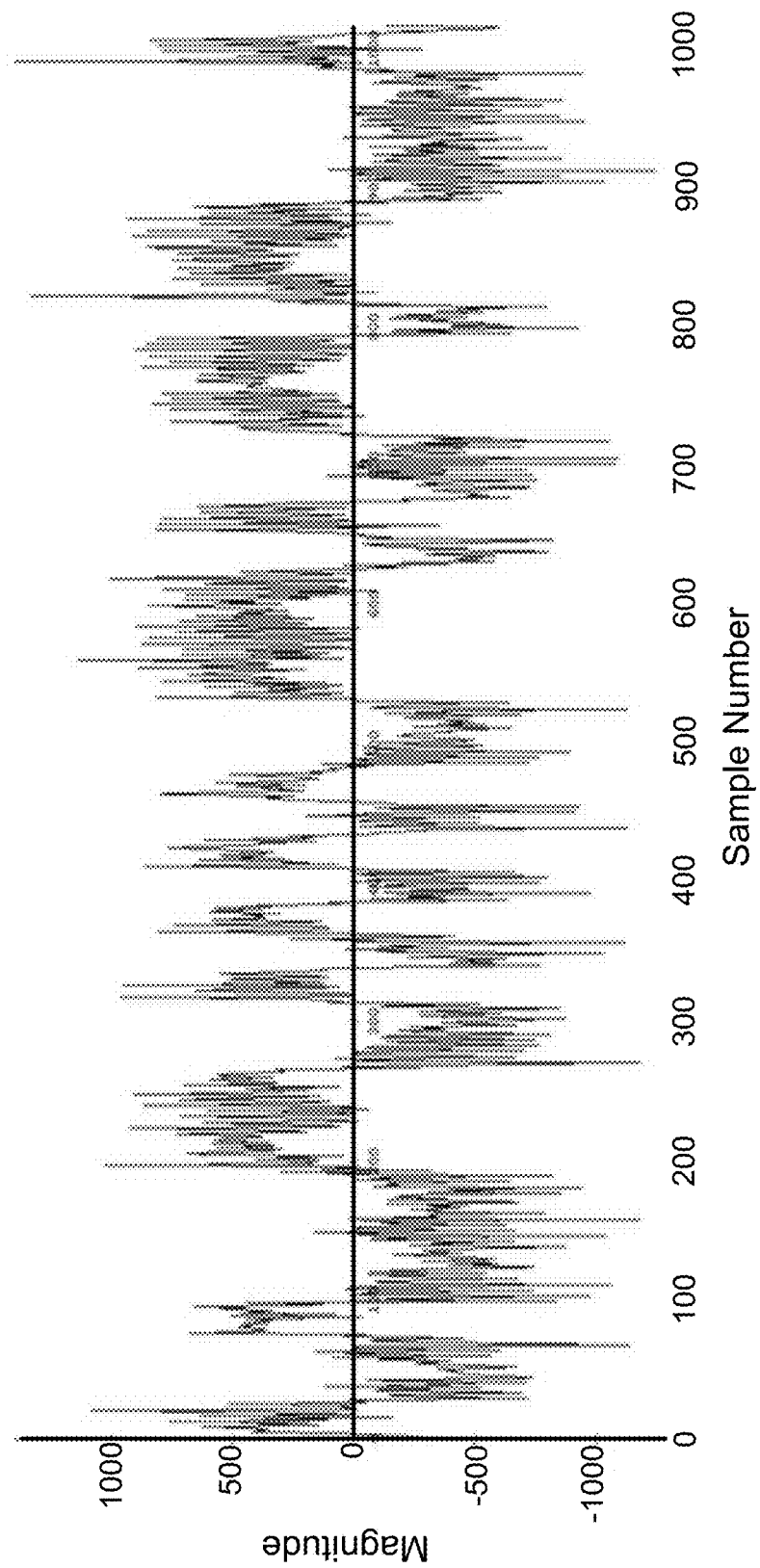
Figure 15: In-phase data from the digital downconverter

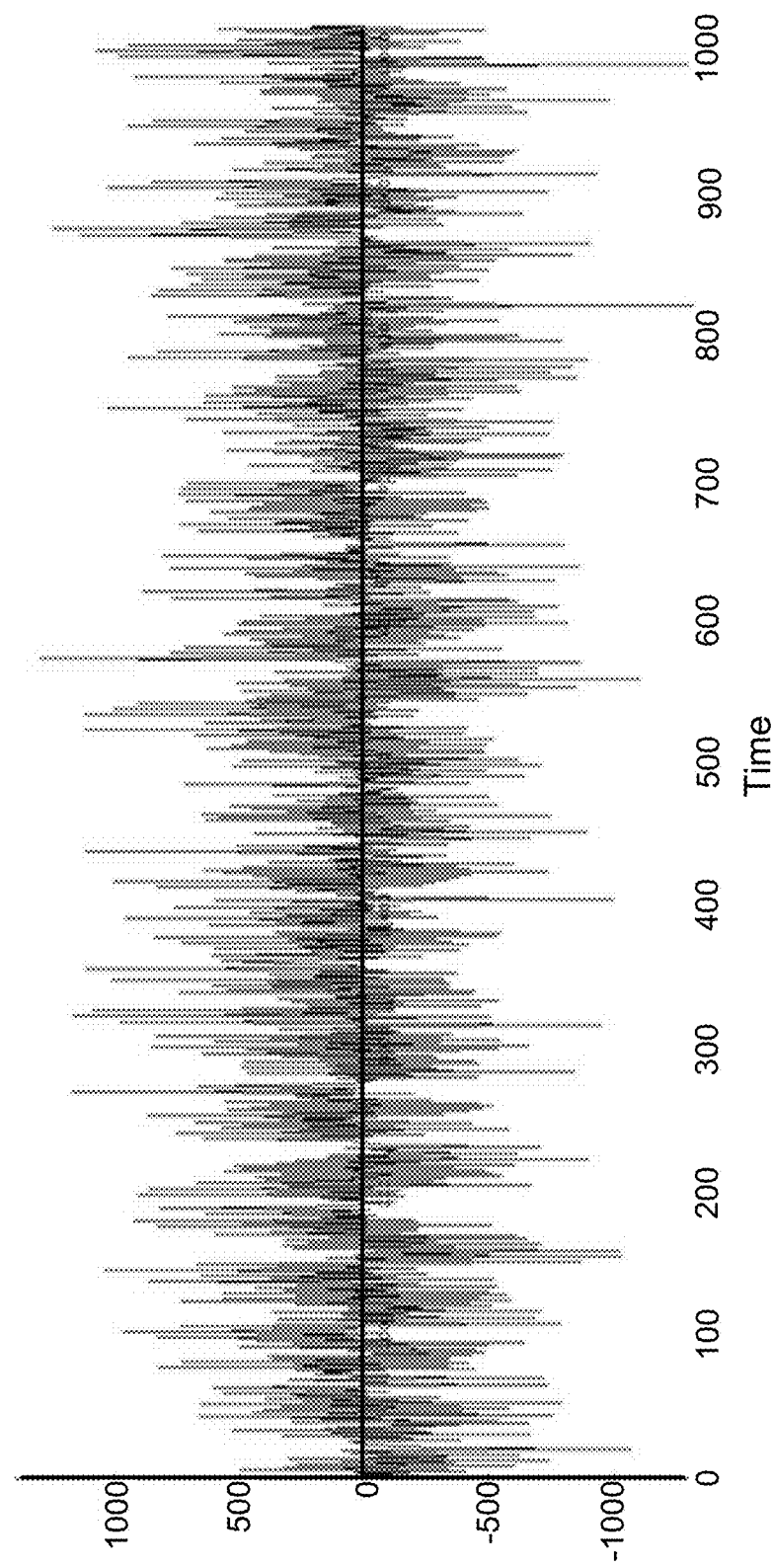
Figure 16: In-quadrature data from the digital downconverter

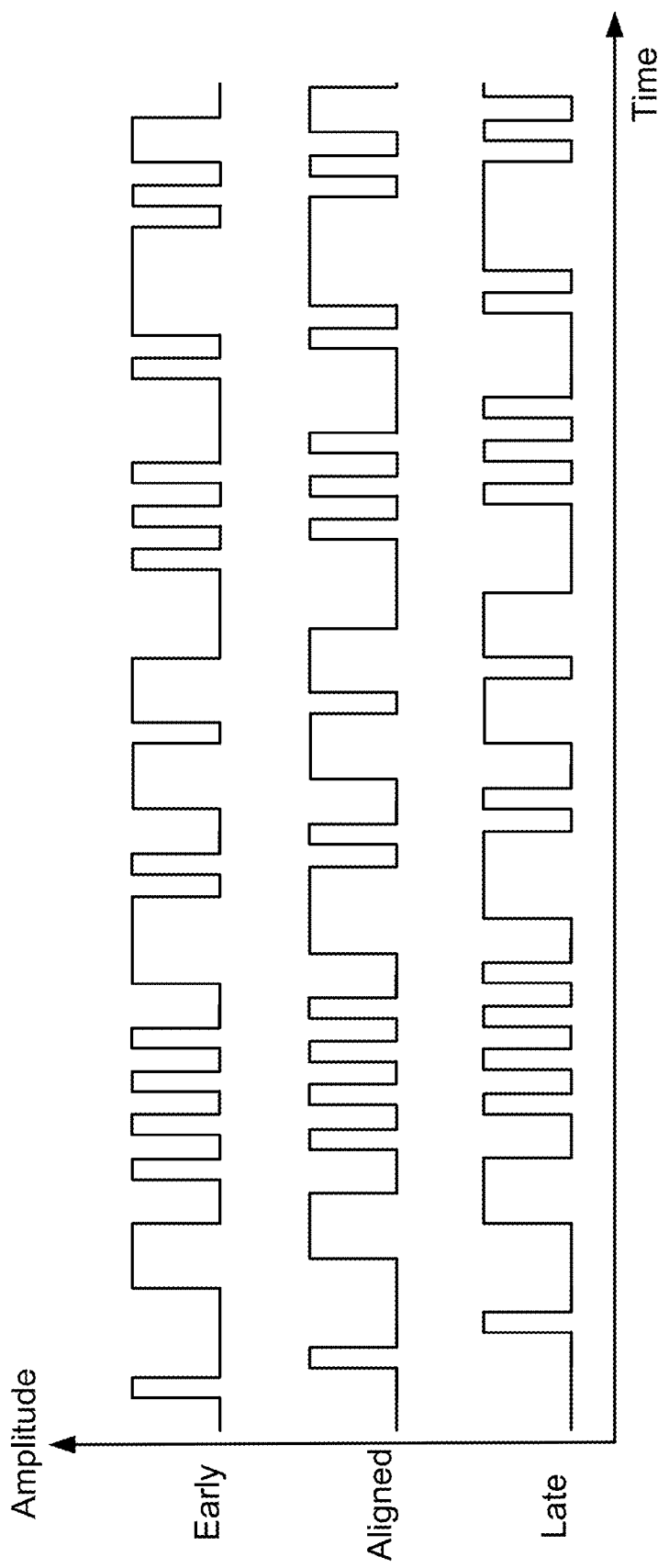
Figure 18: Shifted versions of the reference signal

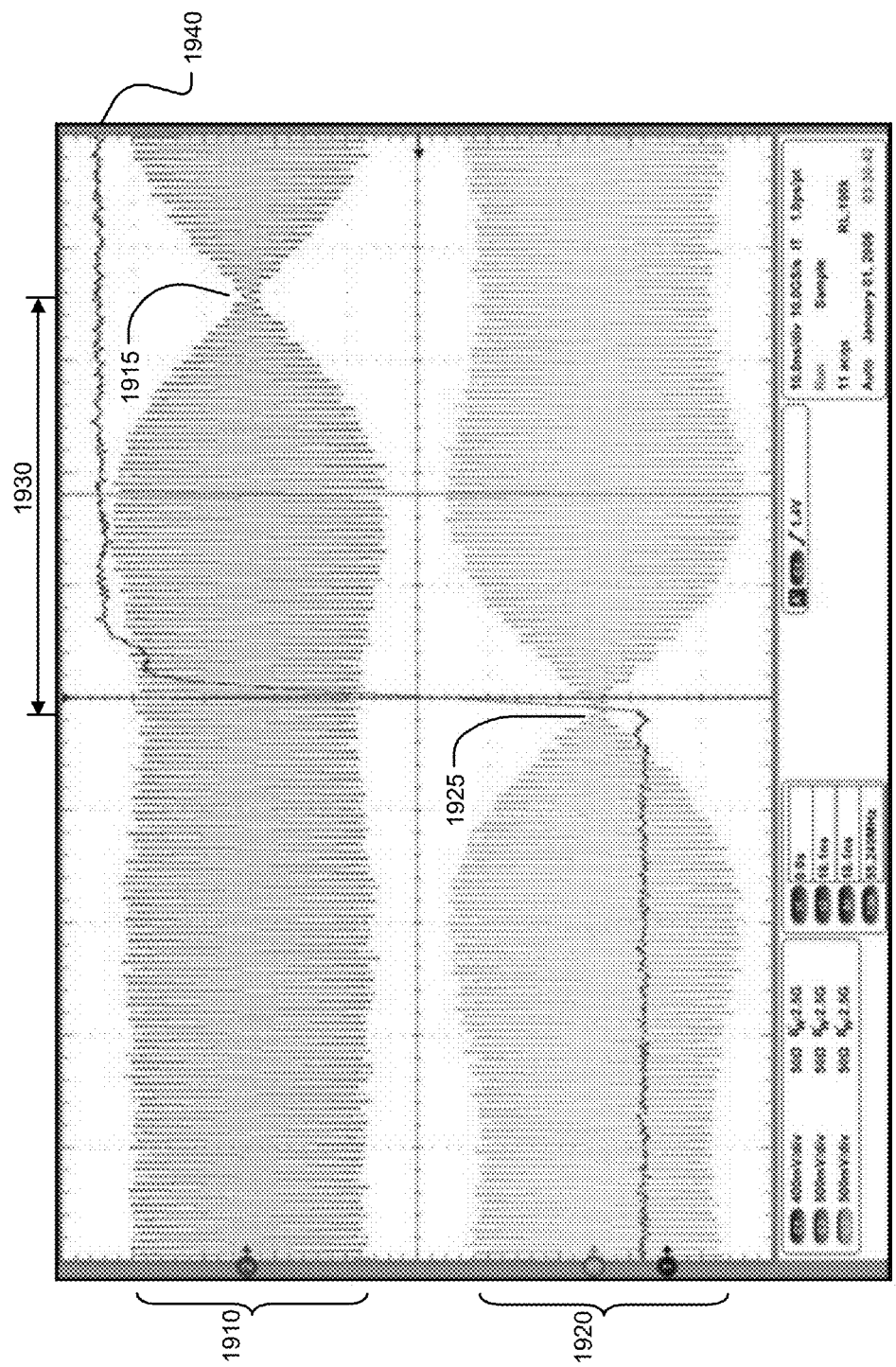
Figure 19: Two misaligned RF signals

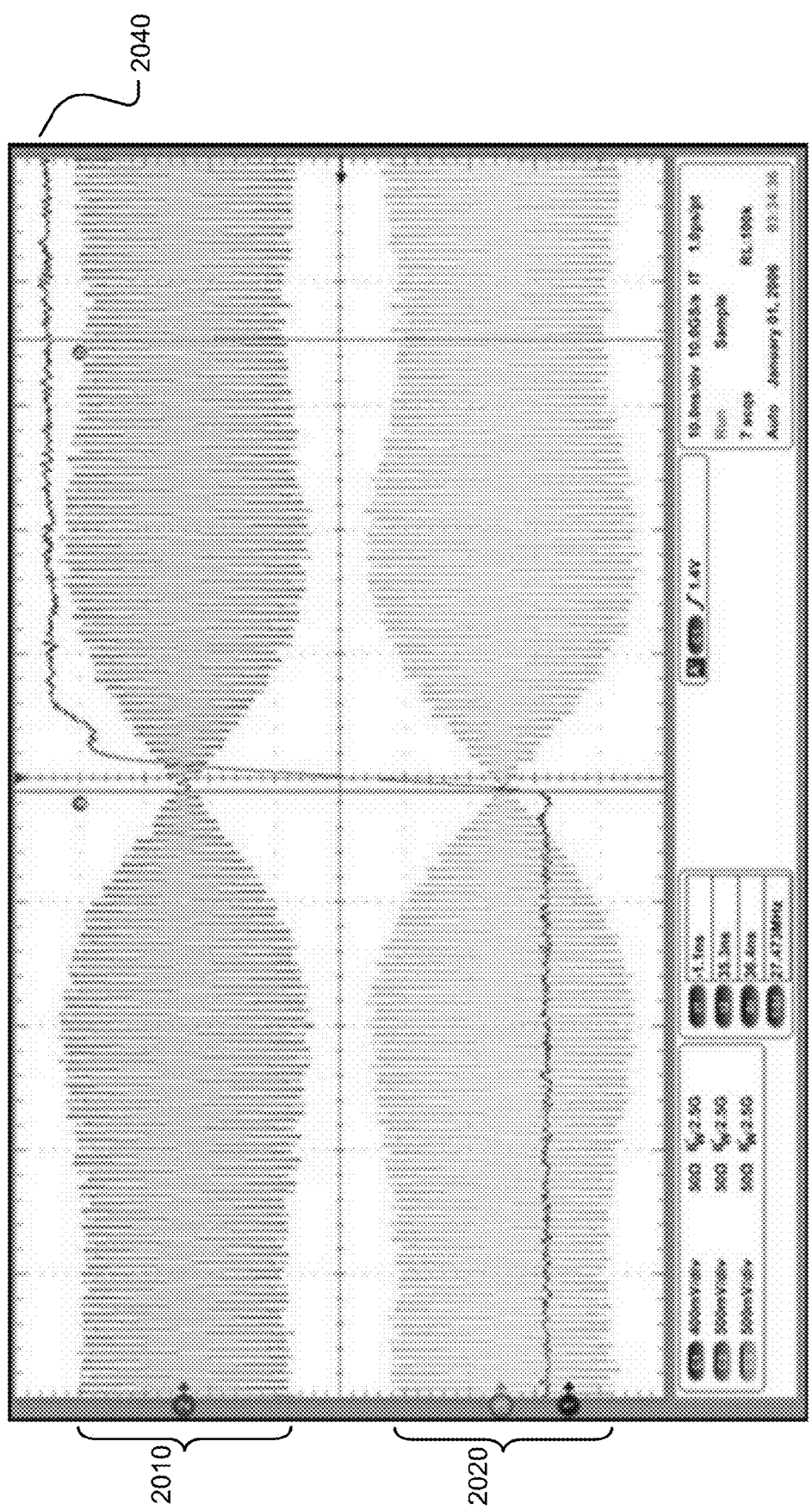
Figure 20: Two aligned RF signals

RF SIGNAL ALIGNMENT CALIBRATION

PRIORITY APPLICATION

This application claims the benefit of the following commonly owned application: United Kingdom Application No. 1414514.8 entitled RF Signal Alignment Calibration, filed the same day as this application. The commonly owned application is hereby incorporated by reference as if fully set forth herein for all purposes.

FIELD OF THE INVENTION

The present invention relates to a test platform for testing radio frequency signals as present in a global navigation satellite system, and more particularly to techniques for aligning RF signals of channel banks.

DESCRIPTION OF RELATED ART

Global Navigation Satellite System (GNSS) simulators are test tools that are able to create Radio Frequency (RF) signals that are practically indistinguishable from the signals that would be received from an actual constellation of moving earth-orbiting navigation satellites at a given location, date and time.

Simulators create the effects of a time-delayed signal representing the transit time of the signal transmission from a satellite thousands of kilometers away from the receiver with appropriate signal level. The simulator can superimpose many real-world effects such as dispersion of the signal due to the electrically-charged Ionosphere leading to signal timing delay and the effects of reception antenna gain and phase variation as a function of arrival angle at the antenna. Other effects can include effects of multi-paths, ionospheric delay, tropospheric delay, terrain obscuration, antenna patterns (gain and phase), and results of interference simulation.

On state-of-the-art GNSS simulators virtually all of these real-world degradations are under the control of the user via a software control interface to a series of mathematical models. On such simulators the time alignment between individual signal components within and between constellation types is necessary to ensure that simulated signals are as representative of those from actual satellites as possible.

Current techniques for code alignment across GNSS carriers and constellations, and also across channel banks and antennas are manual, one-off, time consuming processes which require external test equipment and a degree of invasive measurement. Coupled with these issues, the level of measurement uncertainty introduced by the current techniques significantly adds to the total error budget. Current techniques effectively restrict opportunities for user system reconfiguration and in-field upgrades.

It is desirable to provide a method and device that can automate the initial and post in-field calibration of a GNSS simulator that supports in-field upgrade with the flexibility to change GNSS constellation type/frequency on a scenario-by-scenario basis.

SUMMARY

A method is provided for aligning RF signals of a first channel bank and additional channel banks in a test platform. A plurality of correlators is used to correlate a reference code signal carrying a particular code at a particular chip rate with a received code signal carrying the particular code at the particular chip rate from the first channel bank to establish a first timing offset. The plurality of correlators is used to correlate a continuation of the reference code signal with additional received code signals carrying the particular code at the particular chip rate from the additional channel banks to establish additional timing offsets. The first timing offset is applied to the first channel bank, and the additional timing offsets are applied to the additional channel banks, to align the first channel bank and the additional channel banks Spanning a correlation peak with a code rate of 10 Mcps and a sample rate of 240 Msps (million samples per second) can be handled by 48 correlators operating in parallel. The first timing offset or one of the additional timing offsets is established in a correlation interval having a shorter duration than a length of the particular code.

A new channel bank can be added to the test platform, such as in the field; and the method described above can be rerun with the first channel bank, the additional channel banks and the new channel bank. The method can be adapted to multiple frequency bands of carrier frequency by applying the method to a first carrier frequency, changing to a second carrier frequency, and reapplying the method to the second carrier frequency. The method can be run automatically without connecting additional signal monitoring equipment—such as a spectrum analyzer, an oscilloscope, and a network. analyzer—to the test platform that is having its channel banks aligned.

The method can include a process of correlating the received code signal with shifted versions in a plurality of shifted versions of the reference code signal over the correlation interval to form a correlation peak including results of correlation; and subsequently analyzing the results in the correlation peak to determine the first timing offset.

The correlation peak can have a substantially triangular shape. A substantially triangular shape as used in the present specification refers to the shape of a set of data points as plotted in an X-Y plane, where X refers to a horizontal axis and Y refers to a vertical axis. Each data point corresponds to an x-value on the X-axis and a y-value on the Y-axis. The set of data points includes a particular data point at or near the center of the set in terms of x-values along the horizontal axis. About the same number of data points are on either side of the particular data point along the horizontal axis, where "about the same number" means plus or minus one data point. Data points having x-values smaller than the x-value of the particular data point have y-values that increment from a minimum value, such as 0, towards near the y-value of the particular data point, in order of lower to higher x-values. Data points having x-values larger than the x-value of the particular data point have y-values that decrement from near the y-value of the particular data point towards the minimum value, in order of lower to higher x-values. An increment or decrement in y-values between a pair of adjacent data points can vary from another increment or decrement in y-values between another pair of adjacent data points. An example of a substantially triangular shape is shown between x-values 11 and 59 on the X-axis in FIG. 12.

The correlating process can include multiplying the received code signal with the shifted versions of the reference code signal, and accumulating results of the multiplying for the shifted versions over the correlation interval.

The step of analyzing can include identifying a particular shifted version near a center of the correlation peak: applying a first linear regression over results in the correlation peak shifted from the reference code signal by fewer stages than the number of stages by which the particular shifted version of the reference code signal is shifted; applying a second linear regression over results in the correlation peak shifted from the reference code signal by more stages than the number of stages by which the particular shifted version of the reference code signal is shifted, and calculating the first timing offset using results of applying the first linear regression and applying the second linear regression.

A system for aligning RF signals of a first channel bank and additional channel banks in a test platform is also provided.

Other aspects and advantages of the present invention can be seen on review of the drawings, the detailed description and the claims, which follow.

BRIEF DESCRIPTION OF THE DRAWINGS

FIG. 6 shows a truth table for the XNOR function as used in FIG. 5.

FIG. 7 is a waveform diagram illustrating a correlation result when the two input codes are identical and in phase alignment.

FIG. 8 is a waveform diagram illustrating a correlation result when the two input codes are identical but are misaligned in phase.

FIG. 9 is a waveform diagram illustrating a correlation result when the two input codes are identical and aligned in phase, but have opposite signs.

FIG. 10 is a waveform diagram illustrating a correlation result when the two input codes are different with no correlation.

FIG. 11 is a simplified diagram illustrating circuitry in the digital domain of the calibrator as shown in FIG. 1.

FIG. 12 illustrates a typical correlation peak, obtained by plotting the results from a plurality of correlators.

FIG. 13 is a spectrum plot of an RF signal at an input port of the calibrator.

FIG. 14 is a time domain plot of digital data from an analogue to digital converter in the calibrator.

FIG. 15 is a time domain plot of in-phase data from the digital downconverter in the calibrator.

FIG. 16 is a time domain plot of in-quadrature data from the digital downconverter in the calibrator.

FIG. 18 is a waveform diagram illustrating shifted versions of the reference code signal provided to respective correlators.

FIG. 19 is a waveform illustrating two misaligned RF signals.

FIG. 20 is a waveform illustrating two aligned RF signals.

DETAILED DESCRIPTION

Figure 1:
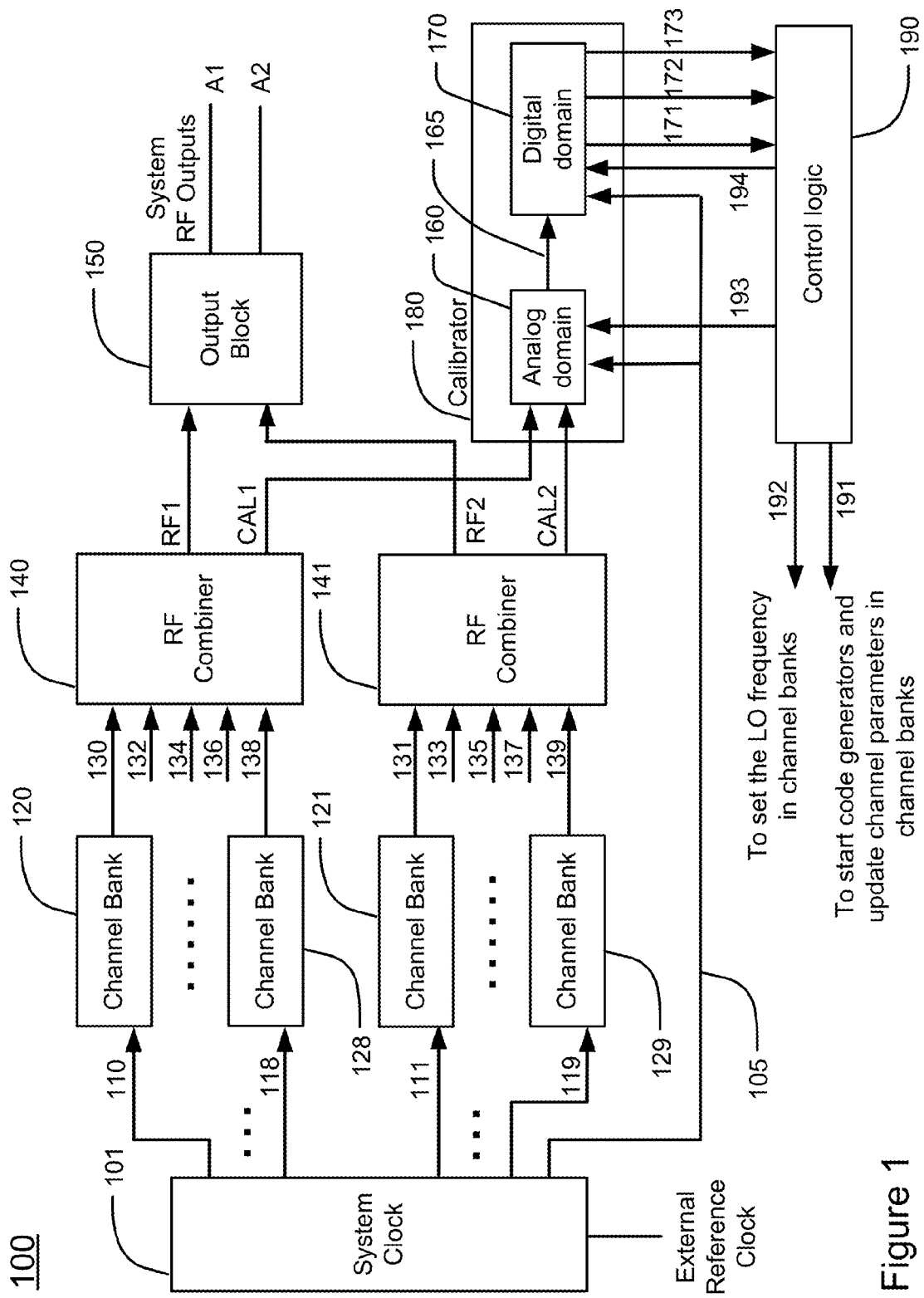
FIG. 1 is a simplified diagram illustrating an RF signal test platform, including circuitry and control logic for RF signal alignment calibration.

A detailed description of implementations of the technology disclosed is provided with reference to FIGS. 1-21. The following description will typically be with reference to specific structural implementations and methods. It is to be understood that there is no intention to limit the invention to the specifically disclosed implementations and methods but that the invention may be practiced using other features, elements, methods and implementations. Preferred implementations are described to illustrate the present invention, not to limit its scope, which is defined by the claims. Those of ordinary skill in the art will recognize a variety of equivalent variations on the description that follows. Like elements in various implementations are commonly referred to with like reference numerals.

The GSS9000 GNSS Simulator manufactured by Spirent Communications plc can support the flexibility to change GNSS constellation type/frequency on a scenario-by-scenario basis. The system also could accept in-field upgrade through the addition of channel banks and enabling of additional signal types on existing channel banks. However, these options cannot reasonably be implemented without an improvement in calibration procedures. Without an improvement, the multiple calibration measurements needed would render in-field upgrade calibration time impractical.

FIG. 1 is a simplified diagram illustrating an RF signal test platform, including circuitry and control logic for RF signal alignment calibration. The test platform includes a plurality of channel banks, including a first channel bank and additional channel banks Although only 4 channel banks (e.g. 120, 128, 121, 129) are shown in FIG. 1, the test platform can be configured with fewer than or more than 4 channel banks. In one implementation, the test platform can include 10 channel banks, and each of the channel banks can generate 16 satellite channels, so the test platform can generate 160 satellite channels.

Each of the channel banks can generate a composite RF signal consisting of 16 individual satellite signals. For instance, channel banks (e.g. 120, 128, 121, 129) can generate composite RF signals (e.g. 130, 138, 131, 139), respectively. Other channel banks (not shown) can generate other RF signals (e.g. 132, 134, 136, 133, 135, 137). For purposes of RF signal alignment calibration, the RF signal can carry a particular sequence of data at a particular data frequency for a particular signal type. A channel bank includes a Digital Signal Processing module known as a signal generator and an Analogue Signal Processing Module known as an RF upconverter. The signal generator is described in connection with FIG. 2, and the RF upconverter is described in connection with FIG. 3.

An RF combiner (e.g. 140) can combine RF signals generated by a group of channel banks (e.g. 130, 132, 134, 136, 138), and produce a combined RF signal RF1 and a test RF signal CAL1. A second RF combiner (e.g. 141) can combine RF signals generated by a second group of channel banks (e.g. 131, 133, 135, 137, 139), and produce a second combined RF signal RF2 and a second test RF signal CAL2. The RF signals RF1 and RF2 are fed to an output block 150 which produces the system RF output. In other configurations signals RF1 and RF2 may not be combined and the system would have multiple RF outputs, such as a first RF output A1 and a second RF output A2, each representing an antenna and containing an individual or a number of RF satellite signals, where the RF satellite signals at the multiple RF outputs are aligned by using the same calibrator (e.g. 180, FIG. 1). The test RF signals CAL1 and CAL2 are fed to a calibrator 180 for RF signal alignment calibration. The test RF signals CAL1 and CAL2 experience the same delay as the combined RF signals RF1 and RF2 respectively, through a chain of electronic and electrical components starting in a channel bank where a digital data signal at baseband is converted to the analogue domain by the digital to analogue converters (DAC).

The calibrator 180 includes circuitry in an analogue domain 160, and circuitry in a digital domain 170. In the analogue domain, a test RF signal (e.g. CAL1 or CAL2) is selected, amplified, downconverted, filtered and further amplified before being converted to a digital signal 165. In the digital domain, the digital signal 165 is demodulated to produce a received code. The received code is then compared against an internal reference code signal to determine a timing offset between the received code and the reference code signal. The internal reference code signal has the same particular sequence of data at the same particular data frequency as the digital signal generated at baseband by a channel bank. The analogue domain 160 and the digital domain 170 are further described in connection with FIG. 4 and FIG. 11.

Control logic 190 can select a particular channel bank to generate a particular sequence of data at a particular data frequency for a particular signal type. The control logic 190 can send a timing signal 191 to the channel banks to start code generators in the channel banks and to update channel parameters in the channel banks. The control logic 190 can send a signal 192 to the channel banks to set the LO frequency in RF upconverters in the channel banks to a value depending on the carrier frequency being generated. The control logic 190 can control frequencies generated by local oscillators in the analogue domain 160 and digital domain 170 of the calibrator 180 via a control signal 193 and a control signal 194, respectively.

The control logic 190 can receive correlation results from the calibrator, and provide a timing offset to a channel bank, to delay a RF signal generated by the channel bank. The control logic 190 can receive a complex baseband signal including I and Q components (e.g. 171, 172) from the calibrator. The I and Q components are used for carrier alignment, ensuring the code is present on the I arm (e.g. 1121) of the downconverter (e.g. 1120, FIG. 11). The control logic 190 uses feedback from signals 171 and 172 to adjust the phase of the Local Oscillator 1110 using signal 194, such that the demodulated code is present on the I Arm only 1121, with the correct polarity.

The control 190 can be implemented in computer software, in firmware, or in an integrated circuit such as a CPU (i.e. central processing unit), a field programmable gate array (FPGA), a programmable logic device (PLD), an application specific integrated circuit (ASIC), a reduced instruction set computing (RISC) device, an advanced RISC machine (ARM), a digital signal processor (DSP), etc. For instance, the control logic 190 can be implemented in the MicroBlaze soft processor core from Xilinx Inc.

A system clock generator 101 receives an external reference clock, and generates clocks (e.g. 110, 118, 111, 119) for respective channel banks (e.g. 120, 128, 121, 129). The system clock generator 101 also generates a system reference clock 105, the analogue domain 160 and the digital domain 170 in the calibrator 180.

Figure 2:
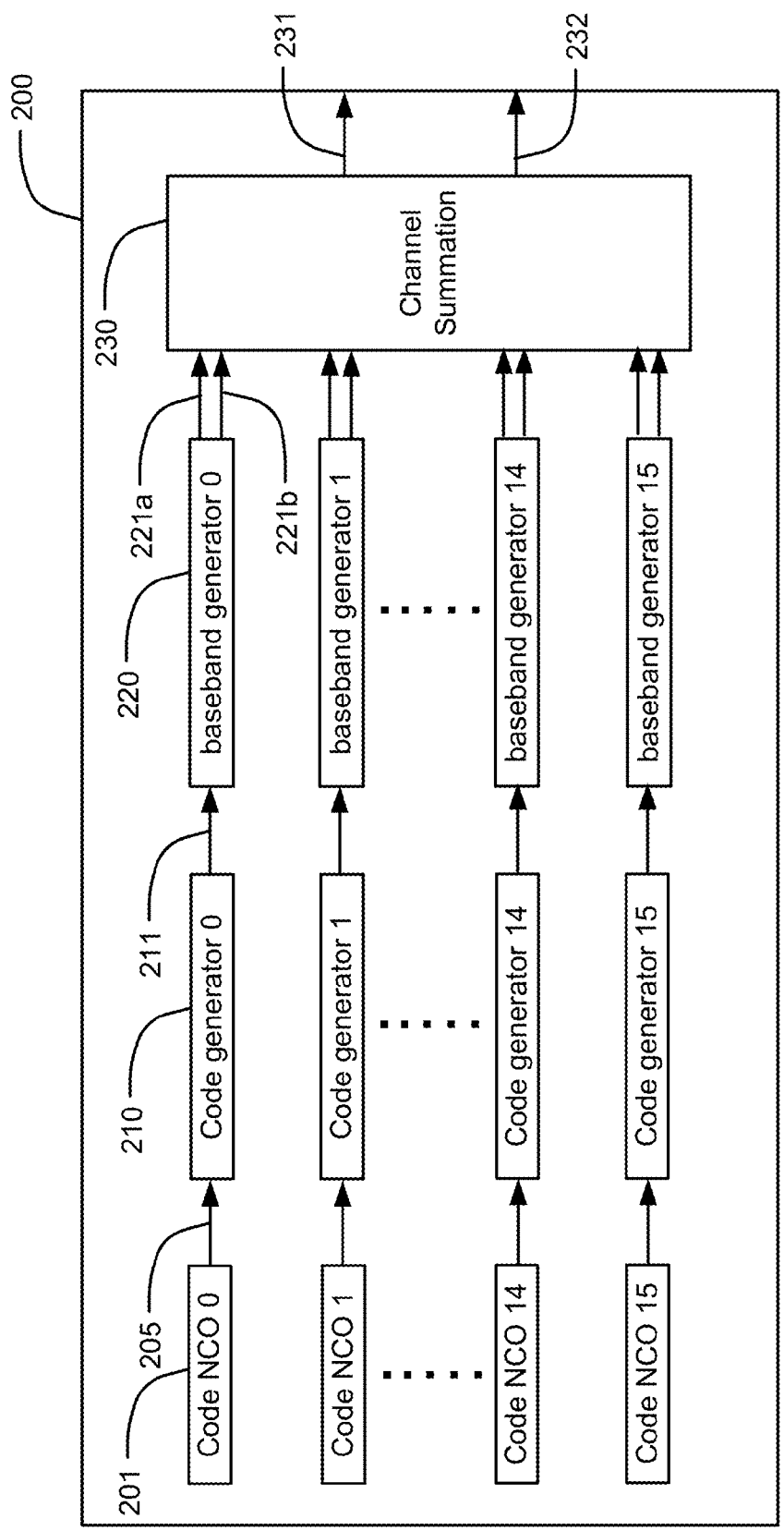
FIG. 2 is a simplified diagram illustrating the digital signal processing portion of a channel bank as shown in FIG. 1.

FIG. 2 is a simplified diagram illustrating a signal generator including the digital signal processing elements of a channel bank. Each channel bank includes multiple code generators, such as 16 code generators, and thus can generate multiple codes simultaneously. For purposes of RF signal alignment calibration, a particular code at a particular carrier frequency on a particular channel bank is generated at a time. Corresponding to 16 code generators, a channel banks includes 16 code NCOs (numerically controlled oscillators), and 16 baseband generators.

A code NCO (e.g. 201) can provide a code rate via a signal (e.g. 205) to a code generator (e.g. 210). The code generator can generate a code via a signal (e.g. 211), such as a sequence of data suitable for determining a timing offset between two signals. The code has a code length, referred to as a code epoch. In one implementation, the sequence of data can be generated using a LFSR (i.e. linear feedback shift register). The LFSR can be used as a pseudo-random number generator which can have a relatively long cycle without repeating itself. In one implementation, the 16 code generators in each channel bank can be implemented in FPGAs (field programmable gate arrays).

A baseband generator (e.g. 220) receives the code on signal 211 from the code generator (e.g. 210), and generates a digital complex data signal at baseband including I and Q components (e.g. 221a, 221b), transmitting the particular sequence of data at a particular data frequency for a particular signal type. The digital data signal can also include navigation data for a satellite channel.

Digital data signals (e.g. 221) at baseband generated by the baseband generators (e.g. 220) can be digitally combined by a channel summation circuit (e.g. 230) to produce a complex digital baseband signal (e.g. 231 and 232) for an RF upconverter in the channel bank, as described in connection with FIG. 3.

A particular signal type is associated with a constellation type, a constellation type can have one or more carriers, and each carrier has its carrier frequency. A timing offset can be used for each channel bank/carrier frequency combination. If the test platform is configured with 10 channel banks, and each channel bank can generate 12 signal types, then a total of 120 timing offsets need to be determined. Once the timing offsets are determined, the test platform can store the timing offsets for each channel bank/carrier frequency combination. Table 1 illustrates center frequencies in MHz for a combination of constellation/carrier combinations (i.e. signal types). For instance, for constellation type GPS and carrier L1, the center frequency is 1575.42 MHz.

TABLE 1

| Signal Type | Center frequency (MHz) |
|---|---|
| GPS L1 | 1575.42 |
| Galileo E1 | |
| GPS L2 | 1227.6 |
| GPS L5 | 1176.45 |
| GLONASS L5 | |
| Galileo E5ab | 1191.795 |
| Galileo E6 | 1278.75 |
| GLONASS F1 F0 | 1602.00 |
| GLONASS F2 F0 | 1246.00 |
| BeiDou B1 | 1561.098 |
| BeiDou B2 | 1207.14 |
| BeiDou B3 | 1268.52 |

Figure 3:
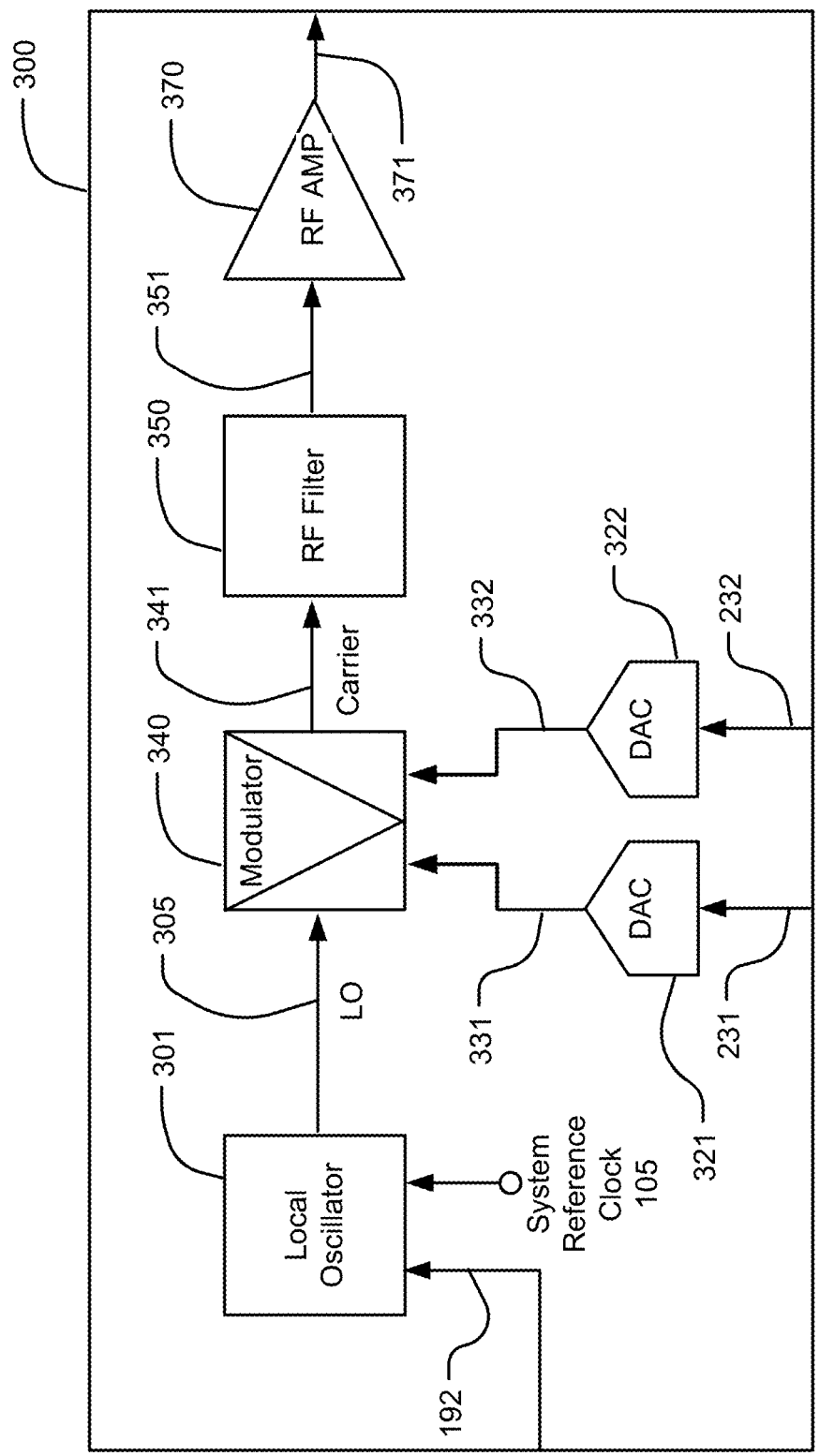
FIG. 3 is a simplified diagram illustrating the analogue signal processing portion of a channel bank, as shown in FIG. 1.

FIG. 3 is a simplified diagram illustrating an RF upconverter 300 including analogue/RF signal processing elements in a channel bank. Digital to analogue converters (DACs) (e.g. 321, 322) in the RF upconverter first convert the complex digital baseband signals (e.g. 231 and 232) received from the channel summation circuit (e.g. 230) in the channel bank into analogue baseband signals (e.g. 331, 332).

A local oscillator (e.g. 301) generates a LO signal (e.g. 305). The control logic 190 sends a signal 192 to the channel banks to set the LO frequency in RF upconverters in the channel banks to a value depending on the carrier frequency being generated. The frequency the LO is set to is close to the carrier frequency. An analogue modulator (e.g. 340) then offsets the LO frequency to create the carrier frequency. This process applies the Doppler frequency offset, accounting for the frequency offset created by the relative movement of the satellite and receiver.

The analogue modulator (e.g. 340) modulates the LO signal with the complex analogue baseband signals to produce an RF carrier signal (e.g. 341). The RF carrier signal contains the same information as the digital baseband signals at 0 Hz but at a different frequency (e.g. 1575 MHz). An RF filter (e.g. 350) filters the RF carrier signal to produce a filtered RF signal (e.g. 351). The RF filter is a band pass filter that allows frequencies 1145-1625 MHz for example. This filter rejects out-of-band spurious signals and harmonics from digital signal processing clocks, for example. An RF amplifier (e.g. 370) amplifies the filtered RF signal 351 to produce the RF output 371. The RF output 371 experiences a delay through a chain of electronic and electrical components starting in a channel bank where a digital data signal at baseband is converted to the analogue domain by the digital to analogue converters (DAC). The delay can include delay through the modulator 340, RF filter 350 and RF Amplifier 370. An instance of the channel bank can be channel bank 120 as shown in FIG. 1, and the RF output 371 can be connected to the RF signal 130 at an output of the channel bank 120.

A complex signal as used in the present application refers to a signal with two components, in-phase and in-quadrature. The complex signal can be a digital or analogue signal and is used to represent a vector, having a magnitude and phase. A complex signal can be used to represent the output of a local oscillator or modulating baseband signal.

Figure 4:
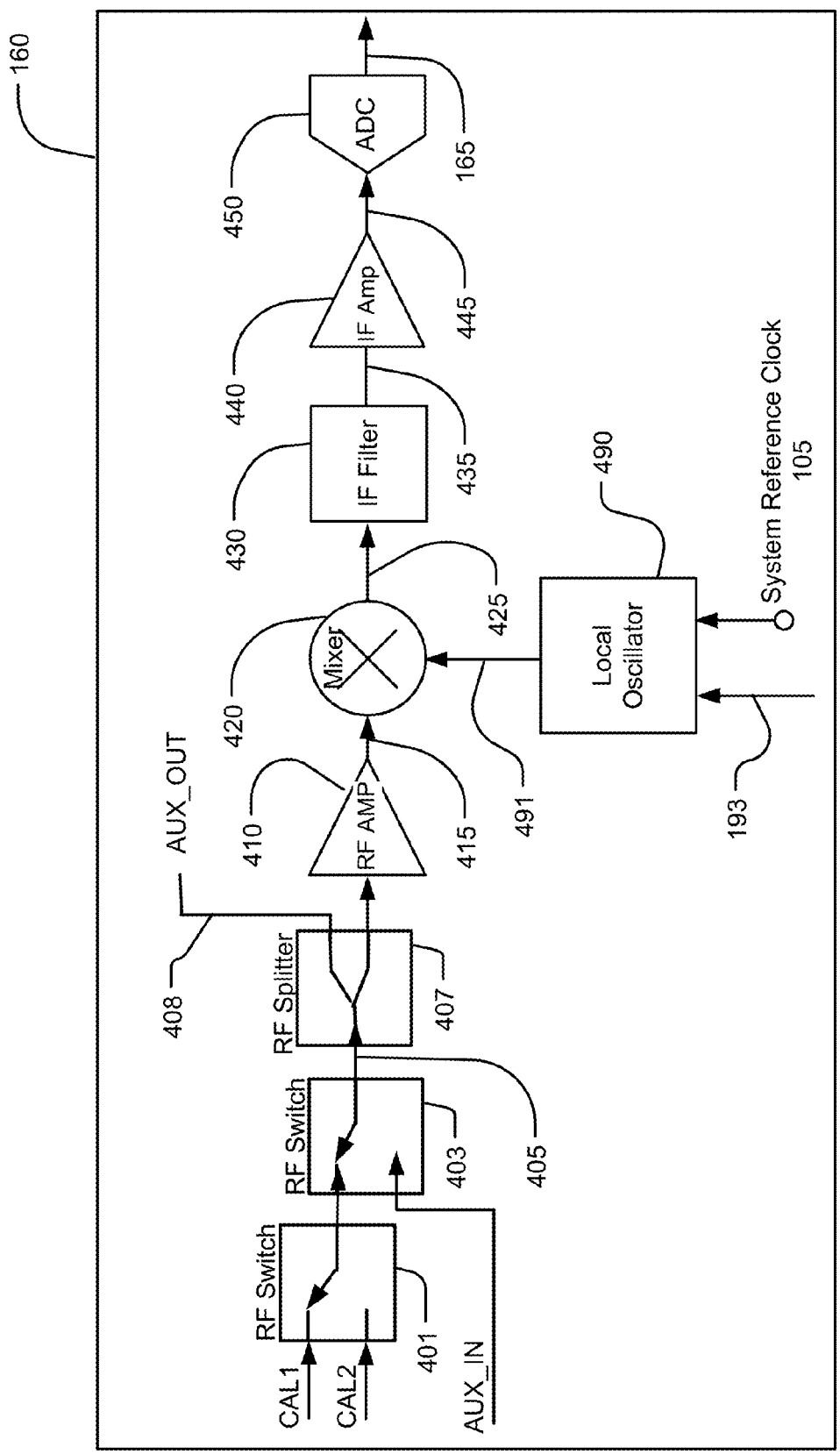
FIG. 4 is a simplified diagram illustrating circuitry in the analogue domain of the calibrator as shown in FIG. 1.

FIG. 4 is a simplified diagram illustrating circuitry in the analogue domain of the calibrator (e.g. 160, FIG. 1). In the analogue domain, two antenna signal inputs CAL1 and CAL2 can be connected to the test RF signals CAL1 and CAL2 from the RF Combiners as shown in FIG. 1, and fed to the RF amplifier 410. For instance, the test RF signals CAL1 and CAL2 can be within a range of 1.2 GHz to 1.6 GHz. An auxiliary input AUX_IN can also be fed to the RF amplifier 410 and connected to the AUX_OUT of another GNSS Signal Generator, allowing signals from an axillary unit to be calibrated. An output AUX_OUT 408 provides a proportion of the selected input signal power to support multi-unit calibration, via an RF splitter 407. RF switches 401 and 403 select between the inputs CAL1, CAL2 and AUX, feeding the RF amplifier 410 with an RF test signal 405. The switching arrangement allows calibration of a system with multiple antennas or a system consisting of multiple GNSS Signal Generators where their output signals are combined.

The test RF signal 405 experiences a delay through a chain of electronic and electrical components starting in a channel bank where a digital data signal at baseband is converted to the analogue domain by the digital to analogue converters (DAC), including components in the RF upconverter, RF combiner and output block, and including connections between the components. Components that introduce variations in delay with temperature, aging, batch to batch, manufacturing variations, and frequency can include DACs, reconstruction filters, modulators, attenuators, printed circuit board (PCB) tracks, RF band pass filters, RF splitters, RF couplers, and RF combiners. Test RF signals (e.g. CAL1, CAL2, FIG. 1) are taken near the end of the chain of electronic and electrical components, such that the test RF signals experience essentially the same delay as the RF signals (e.g. RF1, RF2, FIG. 1) for system RF output.

The RF amplifier 410 amplifies the test RF signal 405 provided by the RF switches to produce an amplified test RF signal 415, without adding more than a minimal amount of noise to the test RF signal, so that the amplified test RF signal can stay above the noise level in succeeding stages. A mixer (e.g. 420) mixes the amplified test RF signal with a signal (e.g. 491) from a local oscillator (e.g. 490) to convert the amplified test RF signal to a first intermediate frequency (IF) signal (e.g. 425), thus reducing the frequency of the RF signal to be within the input bandwidth of the analogue to digital converter ADC (e.g. 450). The local oscillator operates on a system reference clock 105, and is controlled by the control logic (e.g. 190, FIG. 1) via the control signal 193.

An intermediate frequency IF filter (e.g. 430) filters the first intermediate frequency signal 425 to produce a filtered IF signal (e.g. 435). The IF filter is a low-pass filter, for filtering off the sum of the LO and RF signal frequency, leaving the difference signal to be sampled by the ADC 450. An IF amplifier (e.g. 440) amplifies the filtered IF signal 435 to produce the analogue signal 445. The analogue to digital converter 450 samples the analogue signal 445 to produce a digital signal 165 (FIG. 1) at a second intermediate frequency.

For instance, if the test RF signal 405 is at 1575.42 MHz and the signal 491 from the local oscillator 490 is at 1754 MHz, then the mixer 420 produces a first intermediate frequency IF signal 425 at a lower intermediate frequency of 178.58 MHz. The analogue-to-digital converter 450 undersamples the filtered and amplified first IF signal 445 and therefore generates the digital signal 165 at a lower second intermediate frequency 61.42 MHz.

Figure 5:
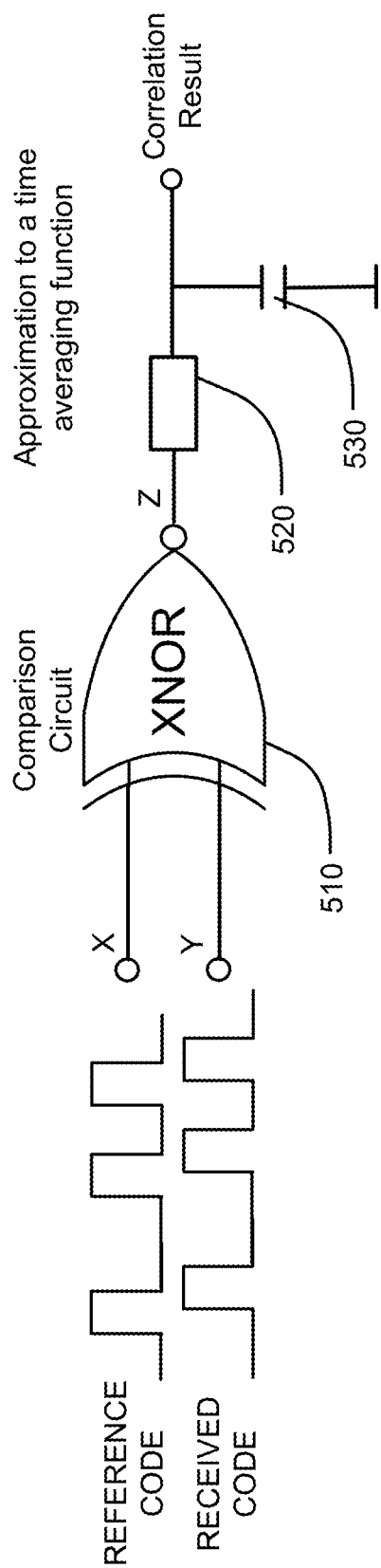
FIG. 5 is a simplified diagram illustrating a quasi-analogue correlator.

FIG. 5 is a simplified diagram illustrating a quasi-analogue correlator. A correlator can compare two input codes, and generate a result indicating a degree of similarity between the two input codes. For two input codes to yield a high correlation result, the two input codes must be identical and also in phase at the inputs of the correlator. The two input codes can be a received code and a reference code (e.g. 1121, 1191, FIG. 11).

In FIG. 5, a received code and a reference code are shown to be identical but offset in phase at inputs (e.g. X, Y) of a correlator that includes an XNOR function 510, a circuit element 520 that can be a resistor, and another circuit element 530 that can be a capacitor. The XNOR function 510 is used as a comparison circuit, while the circuit elements 520 and 530 form an RC (resistor-capacitor) circuit that is used as an approximation to a time averaging function.

In FIG. 6, the truth table for the XNOR function as used in FIG. 5 shows the magnitudes of the received code, the reference code, and the output of the XNOR function (e.g. Z) as between '−1' and '+1'. The table shows that if the magnitudes of the received code and the reference code are either both at '−1' or both at '+1', then the output of the XNOR function is at '+1'. If one of the magnitudes of the received code and the reference code is at '−1' but the other is at '+1', then the output from the XNOR function is at '−1'. The approximation to a time averaging function integrates the output from the XNOR function over the length of a code to create a correlation result representing the degree of correlation of the two input codes over the correlation interval. The length of a code is referred as a code epoch. A code epoch can be long enough without repeating itself for correlation iteration intervals to complete.

For instance, if the output from the XNOR function stays at '+1' over a correlation interval, then the capacitor in the approximation to a time averaging function can be charged to a voltage corresponding to a supply voltage for the XNOR function, indicating identical codes in phase alignment with the same sign over the correlation interval. If the output from the XNOR function stays at '−1' over a correlation interval, then the capacitor in the approximation to a time averaging function can be charged to a negative voltage, indicating different identical codes in phase alignment but with inverted sign having no correlation over the correlation interval. If the output from the XNOR function alternates between '−1' and '+1' over a correlation interval, then the capacitor in the approximation to a time averaging function can be partially charged to a level between −1V to +1V, indicating either non-identical input codes, a phase misalignment or a combination of the two over the correlation interval.

FIG. 7 is a waveform diagram illustrating a correlation result when the two input codes are identical and in phase alignment. The correlation result has a range from −1 to +1 including 0, where 0 indicates no correlation or similarity in the codes. In this example, the correlation output over a correlation interval is +1, which is the maximum value of the code comparison magnitude indicating identical codes in alignment with the same sign.

FIG. 8 is a waveform diagram illustrating a correlation result when the two input codes are identical but are misaligned in phase. In this example, the correlation output over a correlation interval is +0.35, greater than 0 but less than +1, indicating similarity between the input codes with the same sign and that the misalignment between the two input codes is within one chip. A misalignment within one chip can also cause a correlation result to have a negative sign, such as −0.35, less than 0 but greater than −1, depending on the polarity of the input codes.

A chip as used in the present application refers to a single code element. In digital communications, a chip a pulse of a direct-sequence spread spectrum (DSSS) code, such as a pseudo-noise code sequence used in direct-sequence code division multiple access (CDMA) channel access techniques. In a binary direct-sequence system, each chip is typically a rectangular pulse of +1 or −1 amplitude, which is multiplied by a data sequence (similarly '+1' or '−1' representing the message bits) and by a carrier waveform to make the transmitted signal. The chips are therefore just the bit sequence out of the code generator. The chips are called chips to avoid confusing them with message bits. The chip rate of a code is the number of pulses per second (chips per second) at which the code is transmitted (or received).

FIG. 9 is a waveform diagram illustrating a correlation result when the two input codes are identical and aligned in phase, but have opposite signs. In this example, the correlation output over a correlation interval is −1.

FIG. 10 is a waveform diagram illustrating a correlation result when the two input codes are different with no correlation. In this example, the correlation output over a correlation interval is 0.

FIG. 11 is a simplified diagram illustrating circuitry in the digital domain of the calibrator as shown in FIG. 1 (e.g. 170). The input digital signal 165 is produced by the analogue-to-digital converter 450 (FIG. 4), and is centered at an intermediate frequency (e.g. 61.42 MHz).

A local oscillator (e.g. 1110) generates a complex sinusoid at the intermediate frequency (e.g. 61.42 MHz), including a real part (i.e. cos) referred to as an I-component (e.g. 1111) and an imaginary part (i.e. sine) referred to as a Q-component (e.g. 1112). The local oscillator operates on a system reference clock 105, and is controlled by the control logic (e.g. 190, FIG. 1) via the control signal 194. The local oscillator can be implemented using an NCO (Numerically Controlled Oscillator) and a LUT (Look Up Table).

A digital downconverter (e.g. 1120) multiplies the input digital signal 165 with the I-component 1111 and a Q-component 1112 from the local oscillator 1110 to generate an in-phase, received code signal (e.g. 1121) and an in-quadrature signal (e.g. 1122) centered at a sum and difference frequency. The phase of the digital local oscillator 1110 is aligned such that when the carrier is removed, the received code is present on the in-phase, received code signal (e.g. 1121) only. The in-quadrature signal (e.g. 1122) is therefore not needed by subsequent processing as it carries no code information.

Low-pass filters 1131 and 1132 filter downconverted signals (e.g. 1121 and 1122). Filtered results are stored in registers SUM I and SUM Q (e.g. 1141 and 1142). Control logic (e.g. 190 in FIG. 1) can read registers SUM I and SUM Q using signals 171 and 172. During calibration a channel bank first generates a CW signal, thus allowing the control logic to rotate the phase of the downconverter LO 1110 until the phase of signals is 1121 and 1122 is correct. This process ensures that when the code is switched on it will be received on the in-phase arm of the downconverter only with the correct sign.

The in-phase, received code signal 1121 carries a received code. The received code is delayed through a chain of electronic and electrical components starting in a channel bank where a digital data signal at baseband is converted to analogue by two DACs (e.g. 321 and 322 in FIG. 3), including components in the RF combiner 140, and including connections between the components.

The received code signal (e.g. 1121) is compared against a reference code signal (e.g. 1191) to determine a timing offset between the received code and the reference code. The reference code signal has the same particular sequence of data at the same particular data frequency as the digital signal generated at baseband by a channel bank. The reference code signal is generated by a reference code generator (e.g. 1190).

The reference code is a binary sequence with a chip rate of 10 Mcps (millions of chips per second) for example. In one implementation, the code generator can be a Galois linear feedback shift register (LFSR), a structure also known as modular, internal XORs as well as one-to-many LFSR. The reference code generator is connected to a shift register with multiple stages. The reference code is provided to a first stage of the shift register. At every clock cycle of a clock signal (not shown) that controls the reference code generator and the shift register, the value of the reference code at a stage in the shift register is shifted to a next stage, and thus delayed by a period of the system clock. In one implementation, the calibrator is clocked at 240 MHz, the shift register therefore shifts the code every 4.17 ns.

A shift register of N stages, including a first stage 1151 and an Nth stage 1159, shifts the reference code signal through the stages in the shift register to produce a plurality of shifted versions of the reference code signal. N needs to be greater than a minimum number, such as 12 or 48. The larger number ensures that a correlation peak can be established within one correlation interval. In one implementation, N can be 72. Correlators in a plurality of correlators, including a first correlator 1161 and an Nth correlator 1169, are connected to respective stages in the shift register.

The received code is registered by a register (e.g. 1123) to produce a registered version of the received code (e.g. 1124). The register (e.g. 1123) can be on a same clock as each stage of the shift register. Each correlator includes a multiplier (e.g. 1171) and an accumulator (e.g. 1172) connected to the multiplier. Each multiplier is connected to the registered version of the received code, and a shifted version of the reference code. Each accumulator is connected to an output of a respective multiplier.

At the beginning of a correlation interval, a clear signal (e.g. 1173), controlled by the control logic 190, can clear contents of the accumulators in the plurality of correlators. Over the correlation interval, the received code can be correlated with a plurality of shifted versions of the reference code signal to form a correlation peak including results of correlation. The correlation peak can have a substantially triangular shape and be formed by multiple individual accumulator results as shown in FIG. 12. At the end of the correlation interval, accumulated results, including results in the correlation peak from the plurality of correlators (e.g. 1161, 1169), can be sent to the control logic (e.g. 190, FIG. 1) for analysis to determine a timing offset.

In one example, a correlation interval of 100 ms can provide a reliable delay measurement; however when measuring a low power RF input a longer correlation interval can improve the accuracy of the measurement.

Correlating the received code with shifted versions of the reference code signal can include multiplying the received code with the shifted versions of the reference code signal, using the multipliers in the correlators (e.g. 1171), and accumulating results of the multiplying for the shifted versions over the correlation interval, using the accumulators in the correlators (e.g. 1172). Multiplying the received code by the reference code signal has the effect of removing the particular sequence of data in the received code, providing the received code and the reference code signal are in phase alignment. Accumulating results of the multiplying over the correlation interval can create a measure of the similarity between the received code and the reference code signal.

The code rate determines the width of the correlation peak. The system clock frequency determines the number of correlators that can be spread along the peak. The number of correlators needed to cover a correlation peek two chips wide can be calculated using the equation: 2×System Clock Frequency/Code Rate=2×240 MHz/10 Mcps=48. The number of correlators and reference code delay between correlators effectively create a window within which the correlation peak can be detected. For instance, 72 correlators with a shift register clock of 240 MHz 72×1/240 MHz=300 ns. The code frequency is 10 MHz, therefore a chip is 100 ns wide. The correlation peak is two chips wide. If a first chip and a second chip are identical, and are aligned such that the end of the first chip aligns with the start of the second, then sliding one chip over the other until the start of the first chip aligns with the end of the second chip covers two chip lengths. In one implementation, the correlation window can be 300 ns wide, and the correlation peak can be 200 ns wide. The received code can therefore move by 50 ns in either direction and still be successfully detected.

The accuracy of the calibration is determined by the number of correlators that span the correlation peak and the number of code transitions captured during the correlation. Increasing the system clock frequency decreases the delay between shifted versions of the reference code generated by the shift register, and therefore allows more correlators to span the peak, and more data points for the linear regression algorithm. Increasing the correlation interval (time for one correlation) increases the number of code transitions captured and reduces the noise level through additional averaging, therefore increasing accuracy.

In an alternative technique, one single correlator can be used to provide a single measurement per correlation interval. Following the measurement, a different reference code or code phase can be tested according to a predefined searching technique to locate the correlation peak. The presence of the peak confirms that the reference code is present in the received signal, and suitably aligned in time to perform a delay measurement.

The alternative technique has limitations: either received signal must be buffered, to enable multiple shifted versions of the reference code (code phases) to be tested. This allows each code phase to be tested with the same received data. However, to correlate over an extended period of time to improve performance where the received power is low, a large data buffer can be used. The time corresponding to the correlation process to complete is also significantly increased. If each code phase is tested with new live data a buffer is not needed. In this case, each correlation is performed with different received data; errors in the received data are therefore not common between correlation results and degrade the accuracy of the measurement.

The technology described in the present application uses multiple correlators to eliminate the need for buffering or the need to perform multiple sequential runs, to test each shifted version of the reference code.

FIG. 12 is an example plot of amplitude over time, illustrating a correlation peak formed by multiple individual accumulator results where the correlation peak has a substantially triangular shape. The vertical axis corresponds to the amplitude of accumulated results of multiplying the received code with shifted versions of the reference code signal. The amplitude of the correlation peak is proportional to the input RF power level. The horizontal axis corresponds to time, in terms of the number of clock cycles the reference code is shifted at input of a particular correlator. In this example, over a correlation interval, the received code can be correlated with 72 shifted versions of the reference code signal, corresponding to shifted versions 0-71 on the horizontal axis in FIG. 12. In this example, results in the correlation peak correspond to 48 shifted versions from 11 to 59. In another example, results in the correlation peak can correspond to 48 shifted versions starting at an earlier or later shifted version, such as shifted versions from 10 to 58 or from 12 to 60. In yet another example, results in the correlation peak can correspond to more than 48 shifted versions, such as 50 or 52 shifted versions.

As shown in FIG. 12, a particular result corresponding to a particular shifted version of the reference code signal at stage 35, near the center of the correlation peak between stages 11 to 59, has a higher amplitude than other results in the correlation peak. However, in operation, a spurious point in a series of points that are noise only can occur, and appear to have a higher amplitude than other results in the correlation peak, but that point is not a valid correlation result. A valid correlation result is obtained from analysis of multiple accumulator results in the peak.

In one implementation, a first linear regression is applied over correlation results in the peak rising edge. This example shows the peak is in the region of correlator 35. Therefore the rising edge includes the peak version and the preceding 23 correlation results (e.g. stages 11-35), to produce a first linear fit 1201. A second linear regression is applied over correlation results in the peak falling edge. This example shows the peak is in the region of correlator 35. Therefore, the falling edge includes the peak version and the following 23 correlation results (e.g. stages 35-59), to produce a second linear fit 1202.

The timing offset is then calculated using the first linear fit and the second linear fit, as results of applying the first linear regression and applying the second linear regression. The timing offset thus calculated (e.g. 1203) can have a finer resolution than a time period for a stage in the shift register.

FIG. 13 is a spectrum plot of an RF signal at an input port of the calibrator. A spectrum plot or a frequency domain plot can be captured on a spectrum analyzer. The spectrum plot has frequency on the horizontal axis and the magnitude on the vertical axis. The vertical axis displays the power in dBm, abbreviated from decibels with respect to 1 mW (milli-watt). A decibel is a logarithmic scale used to express the ratio between two values of a physical quantity. The horizontal axis displays frequency of the RF signal (e.g. CAL1, FIG. 4) centered at 1.57542 GHz in a range of 60 MHz, as indicated by a marker.

FIG. 14 is a time domain plot of digital data from an analogue-to-digital converter (e.g. 450, FIG. 4) in the calibrator. A time domain plot can be captured on an oscilloscope at the point before it is sampled by the ADC or in the digital domain by a logic analyzer or embedded logic analyzer, such as Xilinx Chipscope, after the ADC. The vertical axis displays the magnitude of the digital data in quantization levels on the analogue-to-digital converter, while the horizontal axis displays time in sample number with a 240 MHz clock. The digital data includes the code, e.g., the sequence of data generated by the code generator (e.g. 210, FIG. 2), as will become obvious after digital downconversion by the digital downconverter (e.g. 1120, FIG. 11).

FIG. 15 is a time domain plot of in-phase data from the digital downconverter (e.g. 1120, FIG. 11) in the calibrator. The vertical axis displays the magnitude of the in-phase data in quantization levels on the digital downconverter, while the horizontal axis displays time in sample number with a 240 MHz clock. The in-phase signal (e.g. 1121) carries the code, e.g., the sequence of data generated by the code generator (e.g. 210, FIG. 2). The code as shown in the time domain plot in FIG. 15 has the same sequence of data as shown for the shifted versions of the reference code signal in FIG. 17.

FIG. 16 is a time domain plot of in-quadrature data from the digital downconverter in the calibrator. The vertical axis displays the magnitude of the in-quadrataure data, while the horizontal axis displays time. The in-quadrataure data does not include the code.

Figures 17A, 17B, 17C:
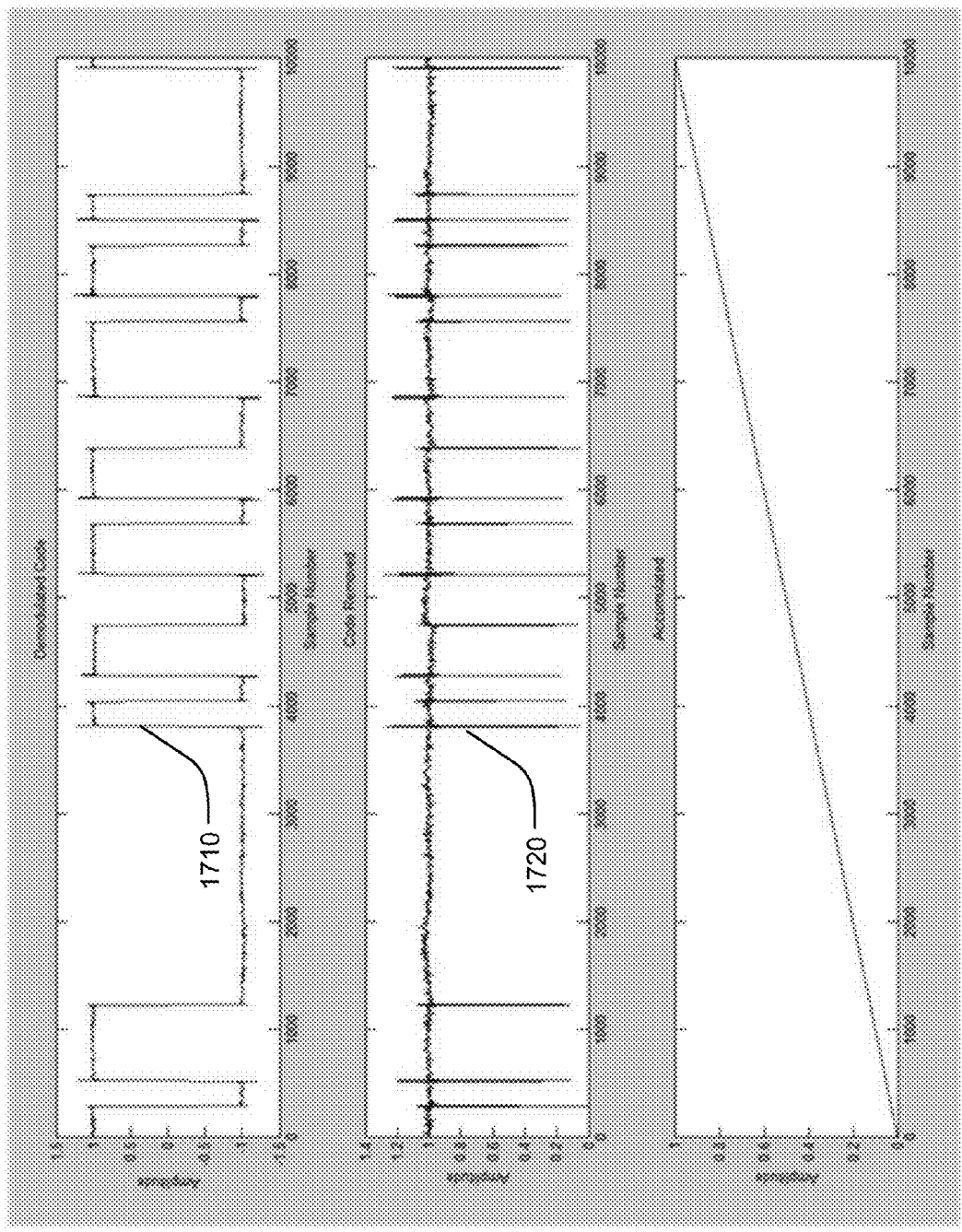
FIGS. 17A, 17B and 17C are amplitude vs sample number plots for signals of the correlator as shown in FIG. 11.

FIGS. 17A, 17B and 17C are amplitude vs sample number plots for signals of a correlator (e.g. 1161, FIG. 11). In FIGS. 17A, 17B and 17C, the horizontal axis shows the sample number with a 240 MHz clock, and the vertical axis shows the normalized amplitudes for signals 1124 (FIG. 11) at the multiplier input, the output of the multiplier and the output of the accumulator. For the examples shown in FIGS. 17A, 17B and 17C, the reference code and the received code at the correlator inputs are identical and in phase alignment. The reference code from shift register 1151 is not displayed.

In FIG. 17A, the received code 1124 at the multiplier input (FIG. 11) is displayed. The received code can be the result of demodulating and downconverting an RF signal.

In FIG. 17B, the signal at the output of the correlator multiplier (FIG. 11) is displayed. The multiplier function performs an instantaneous comparison between the received and reference codes, with an output representing the result of the instantaneous comparison. As the plot in FIG. 17B was captured from a real calibrator module, glitches (e.g. 1720) can be seen where the signal was sampled on a signal transition (e.g. 1710) or overshoot. The glitches are the result of a small misalignment between transitions of the received and reference code.

In FIG. 17C, the correlator output is displayed. The correlator multiplier result is accumulated over the samples in a correlation interval. As many as 240,000 samples are taken. The graph displays 10,000 samples, for ease of waveform visibility. The correlator multiplier starts at '0' and approaches '1', as the reference code 1151 and the received code 1124 (FIG. 11) are identical and in phase alignment.

FIG. 18 is a waveform diagram illustrating shifted versions of the reference code signal (e.g. 1191, FIG. 11) provided to respective correlators. The vertical axis displays the magnitude of the shifted versions of the reference code signal, while the horizontal axis displays time. In this example, the early, aligned and late shifted versions are displayed, and can correspond to stages 0, 35 and 71 in the shift register, respectively, assuming the shift register has 72 stages ranging from 0 to 71.

FIG. 19 is a waveform illustrating two misaligned RF signals (e.g. 1910 and 1920). The two RF signals have respective code transitions (e.g. 1915 and 1925). The time difference (e.g. 1930) between the respective code transitions illustrates the misalignment in phase between the two RF signals, before using the RF signal alignment calibration as described herein. The time domain plot also displays a 1 PPS (i.e. pulse per second) reference timing signal (e.g. 1940). A code transition of one of the two RF signals (e.g. 1920) occurs at a rising edge of the reference timing signal.

FIG. 20 is a waveform illustrating two aligned RF signals (e.g. 2010 and 2020). The two RF signals have respective code transitions occurring at a same time at a rising edge of the reference timing signal (e.g. 2040), showing the two RF signals are aligned, after using the RF signal alignment calibration as described herein.

Figure 21:
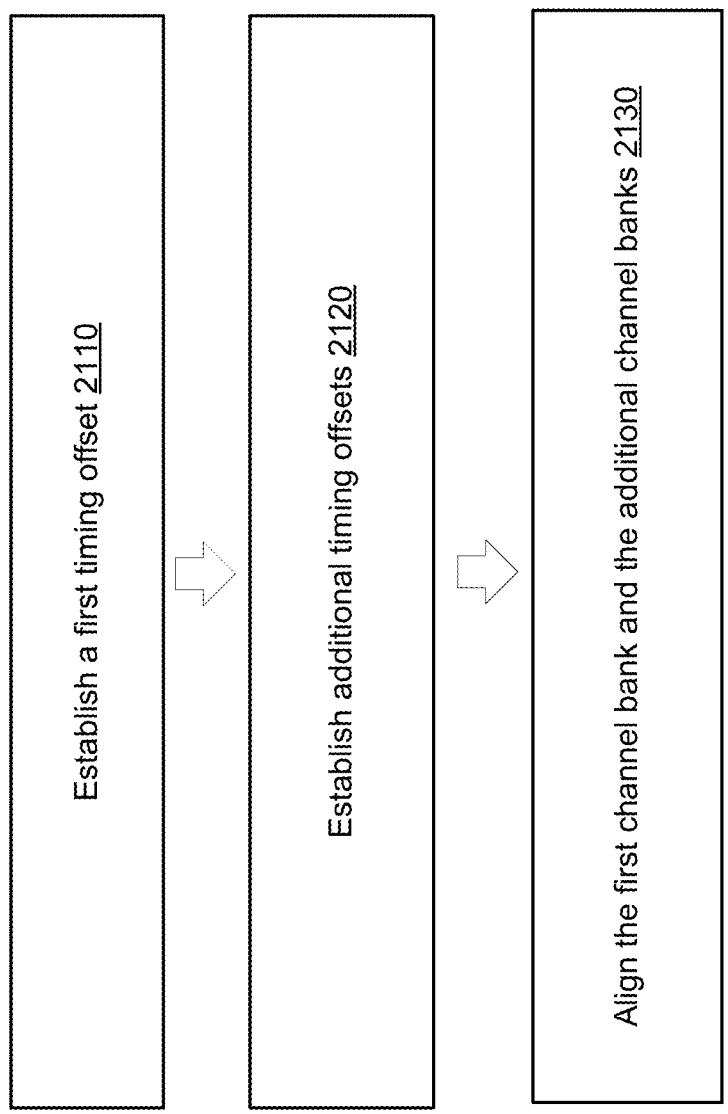
FIG. 21 is a flow diagram of a method for aligning RF signals of a first channel block and additional channel blocks.

FIG. 21 is a flow diagram of a method for aligning RF signals of a first channel block and additional channel blocks. To establish a first timing offset 2110, use a plurality of correlators to correlate a reference code signal carrying a particular code at a particular chip rate with a received code signal carrying the particular code at the particular chip rate from the first channel bank. To establish additional timing offsets 2120, use a plurality of correlators to correlate a continuation of the reference code signal with additional received code signals carrying the particular code at the particular chip rate from the additional channel banks to establish additional timing offsets. To align the first channel bank and the additional channel banks 2130, apply the first timing offset to the first channel bank, and the additional timing offsets to the additional channel banks. The plurality of correlators includes at least 12 or 48 correlators, and the timing offset or one of the additional timing offsets is established in a correlation interval having a shorter duration than the particular code.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of aligning RF signals of a first channel bank and one or more additional channel banks in a test platform, comprising:

using a plurality of correlators to correlate a reference code signal carrying a particular code at a particular chip rate with a received code signal carrying the particular code at the particular chip rate from the first channel bank to establish a first timing offset;

using the plurality of correlators to correlate a continuation of the reference code signal with additional received code signals carrying the particular code at the particular chip rate from the additional channel banks to establish additional timing offsets; and applying the first timing offset to the first channel bank, and the additional timing offsets to the additional channel banks, to align the first channel bank and the additional channel banks, wherein the plurality of correlators includes at least 12 correlators, and the first timing offset or one of the additional timing offsets is established in a correlation interval having a shorter duration than the particular code.

2. The method of claim 1, further comprising at least 48 correlators.

3. The method of claim 1, comprising:
adding a new channel bank to the test platform; and
rerunning the method with the first channel bank, the additional channel banks and the new channel bank.

4. The method of claim 1, comprising:
adapting to multiple frequency bands of carrier frequency by applying the method to a first carrier frequency, changing to a second carrier frequency, and reapplying the method to the second carrier frequency.

5. The method of claim 1, comprising:
running the method automatically without connecting additional signal monitoring equipment to the test platform that is having its channel banks aligned.

6. The method of claim 1, comprising:
correlating the received code signal with shifted versions in a plurality of shifted versions of the reference code signal over the correlation interval to form a correlation peak including results of said correlating; and
analyzing the results in the correlation peak to determine the first timing offset.

7. The method of claim 6, said correlating comprising:
multiplying the received code signal with the shifted versions in the plurality of shifted versions of the reference code signal; and
accumulating results of the multiplying for the shifted versions over the correlation interval.

8. The method of claim 6, said analyzing comprising:
identifying a particular shifted version of the reference code signal near a center of the correlation peak;
applying a first linear regression over results in the correlation peak shifted from the reference code signal by fewer stages than a number of stages by which the particular shifted version is shifted;
applying a second linear regression over results in the correlation peak shifted from the reference code signal by more stages than the number of stages by which the particular shifted version is shifted; and
calculating the first timing offset using results of said applying the first linear regression and said applying the second linear regression.

9. The method of claim 6, wherein the correlation peak has a substantially triangular shape.

10. The method of claim 1, comprising:
running the method with a second channel bank and a second set of additional channel banks in the test platform using the plurality of correlators to align the second channel bank and the second set of additional channel banks;
combining outputs of the first channel bank and the additional channel banks to produce a first RF output; and
combining outputs of the second channel bank and the second set of additional channel banks to produce a second RF output,
wherein the first RF output and the second RF output are aligned.

11. A system for aligning RF signals of a first channel bank and one or more additional channel banks in a system, comprising:

a reference code generator to generate a reference code signal carrying a particular code at a particular chip rate;

a shift register connected to the reference code signal to generate shifted versions of the reference code signal;

a plurality of correlators connected to respective shifted versions of the reference code signal; and control logic including logic to use the plurality of correlators to correlate the reference code signal with a received code signal carrying the particular code at the particular chip rate from the first channel bank to establish a first timing offset, to use the plurality of correlators to correlate a continuation of the reference code signal with additional received code signals carrying the particular code at the particular chip rate from the additional channel banks to establish additional timing offsets, to apply the first timing offset to the first channel bank, and to apply the additional timing offsets to the additional channel banks, to align the first channel bank and the additional channel banks, wherein the plurality of correlators includes at least 12 correlators, and the first timing offset or one of the additional timing offsets is established in a correlation interval having a shorter duration than the particular code.

12. The system of claim 11, further comprising at least 48 correlators.

13. The system of claim 11, wherein each correlator in the plurality of correlators includes:
a multiplier to multiply the received code signal with a shifted version of the reference code signal; and
an accumulator to accumulate an amplitude from results of the multiplier for the shifted version over the correlation interval.

14. The system of claim 11, the control logic including:
rerunning the logic with the first channel bank, the additional channel banks and a new channel bank added into the system.

15. The system of claim 11, the control logic including:
adapting to multiple frequency bands of carrier frequency by applying the logic to a first carrier frequency, changing to a second carrier frequency, and reapplying the logic to the second carrier frequency.

16. The system of claim 11, the control logic including:
running the logic automatically without connecting additional signal monitoring equipment to the system that is having its channel banks aligned.

17. The system of claim 11, the control logic including:
correlating the received code signal with the shifted versions of the reference code signal over the correlation interval to form a correlation peak including results of said correlating; and
analyzing the results in the correlation peak to determine the first timing offset.

18. The system of claim 17, the control logic including:
identifying a particular shifted version of the reference code signal near a center of the correlation peak;
applying a first linear regression over results in the correlation peak shifted from the reference code signal by fewer stages than a number of stages by which the particular shifted version is shifted;
applying a second linear regression over results in the correlation peak shifted from the reference code signal by more stages than the number of stages by which the particular shifted version is shifted; and
calculating the first timing offset using results of said applying the first linear regression and said applying the second linear regression.

19. The system of claim 17, wherein the correlation peak has a substantially triangular shape.

20. The system of claim 11, comprising a second channel bank and a second set of additional channel banks, wherein the control logic including:
running the logic with the second channel bank and the second set of additional channel banks using the plurality of correlators to align the second channel bank and the second set of additional channel banks;
combining outputs of the first channel bank and the additional channel banks to produce a first RF output; and
combining outputs of the second channel bank and the second set of additional channel banks to produce a second RF output,
wherein the first RF output and the second RF output are aligned.

* * * * *